(12) United States Patent
Buldas et al.

(10) Patent No.: US 9,122,846 B2
(45) Date of Patent: *Sep. 1, 2015

(54) DOCUMENT VERIFICATION WITH DISTRIBUTED CALENDAR INFRASTRUCTURE

(71) Applicant: Guardtime IP Holdings Limited, Tortola (VG)

(72) Inventors: Ahto Buldas, Tallinn (EE); Märt Saarepera, Tallinn (EE)

(73) Assignee: GUARDTIME IP HOLDINGS LIMITED, Tortola (VG)

( * ) Notice: Subject to any disclaimer, the term of this patent is extended or adjusted under 35 U.S.C. 154(b) by 0 days.

This patent is subject to a terminal disclaimer.

(21) Appl. No.: 14/265,478

(22) Filed: Apr. 30, 2014

(65) Prior Publication Data

US 2014/0282863 A1 Sep. 18, 2014

Related U.S. Application Data

(60) Continuation of application No. 13/625,551, filed on Sep. 24, 2012, now Pat. No. 8,719,576, which is a continuation-in-part of application No. 12/696,623, filed on Jan. 29, 2010, now Pat. No. 8,312,528, which is a division of application No. 11/005,838, filed on Dec. 7, 2004, now Pat. No. 7,698,557.

(60) Provisional application No. 60/531,865, filed on Dec. 22, 2003.

(51) Int. Cl.
*H04L 29/06* (2006.01)
*G06F 21/30* (2013.01)
*G06F 21/64* (2013.01)
*H04L 9/32* (2006.01)

(52) U.S. Cl.
CPC .............. *G06F 21/30* (2013.01); *G06F 21/64* (2013.01); *G06F 21/645* (2013.01); *H04L 9/3265* (2013.01); *H04L 2209/38* (2013.01)

(58) Field of Classification Search
CPC ... H04L 9/3265; H04L 9/3281; H04L 9/3286; H04L 9/3236; H04L 9/3242; H04L 9/3247; H04L 9/3249; H04L 9/3255; H04L 9/3257; H04L 29/06775; H04L 29/06761; H04L 29/06857; H04L 2209/38; G06F 21/64; G06F 21/30; G06F 21/645
See application file for complete search history.

(56) References Cited

U.S. PATENT DOCUMENTS

| | | | | |
|---|---|---|---|---|
| 5,781,629 | A | * | 7/1998 | Haber et al. ................ 713/177 |
| 5,946,396 | A | * | 8/1999 | Davis ............................ 713/178 |
| 2003/0120939 | A1 | * | 6/2003 | Hughes et al. ............... 713/191 |
| 2005/0114666 | A1 | * | 5/2005 | Sudia ........................... 713/175 |
| 2009/0100041 | A1 | * | 4/2009 | Wilson .............................. 707/5 |

* cited by examiner

*Primary Examiner* — Yogesh Paliwal
(74) *Attorney, Agent, or Firm* — Jeffrey Pearce

(57) ABSTRACT

Transformations of digital records are used as lowest level inputs to a tree data structure having a root in a core system and having nodes computed as digital combinations of child node values. Signature vectors are associated with the digital records and have parameters that enable recomputation upward through the tree data structure to either a current calendar value or onward to a composite calendar value that is a function of calendar values in a calendar, which comprises a set of computed calendar values, such that the calendar values have a time correspondence. Recomputation yields the same value only if a candidate digital record is an exact version of the original digital record included in the original computation of the value, indicating authentication of the candidate digital record. The authentication process as such is independent of any trust authority that issues cryptographic keys.

6 Claims, 15 Drawing Sheets

FIG. 11

| $n$ | State hash | $x$ | Audit_log | a | Computations |
|---|---|---|---|---|---|
| 0 | [] | $x_0$ | $[x_0]$ | 0 | - |
| 1 | $[x_0]$ | $x_1$ | [] | 1 | $h_{0,1}$ = Hash($x_0, x_1$) |
|  | [] | - | $[x_0 x_1 h_{0,1}]$ | 0 | - |
| 2 | $[h_{0,1}]$ | $x_2$ | $[x_0 x_1]$ | 2 | - |
| 3 | $[h_{0,1} x_2]$ | $x_3$ | $[x_0 x_1 x_2]$ | 3 | $h_{2,3}$ = Hash($x_2, x_3$) |
|  | $[h_{0,1}]$ | - | $[x_0 x_1 h_{0,1} x_2 x_3]$ | 1 | $h_{0,3}$ = Hash($h_{0,1}, h_{2,3}$) |
|  | [] | - | $[x_0 x_1 h_{0,1} x_2 x_3 h_{0,3}]$ | 0 | - |
| 4 | $[h_{0,3}]$ | $x_4$ | $[x_0 x_1 h_{0,1} x_2 x_3 h_{2,3} h_{0,3} x_4]$ | 4 | - |
| 5 | $[h_{0,3} x_4]$ |  |  |  |  |

FIG. 12

| head | tail | $j$ | $b$ | $f=(n \oplus b)\, or\, (b-1)$ | $f \leq N$ | $n\&b=b$ | $2f-j$ | $2f-j+2$ |
|---|---|---|---|---|---|---|---|---|
| [] | [] | 2 | 1 | 5 | true | false | 8 | - |
| [] | $[x_5]$ | 2 | 2 | 7 | true | false | 12 | - |
| [] | $[x_5\, h_{6,7}]$ | 2 | 4 | 3 | true | true | 6 |  |
| $[h_{0,3}]$ | $[x_5\, h_{6,7}]$ | 1 | 8 | 15 | false | - | - | - |

FIG. 13

| head | tail | $j$ | $b$ | $f=(n \oplus b)\, or\, (b-1)$ | $f \leq N$ | $n\&b=b$ | $2f-j$ | $2f-j+2$ |
|---|---|---|---|---|---|---|---|---|
| [] | [] | 3 | 1 | 2 | true | false | - | 3 |
| $[x_3]$ | [] | 2 | 2 | 1 | true | false | - | 2 |
| $[x_2\, h_{0,1}]$ | [] | 1 | 4 | 7 | true | true | 13 | - |
| $[x_2\, h_{0,1}]$ | $[h_{4,7}]$ | 1 | 8 |  | false | - | - | - |

DOCUMENT VERIFICATION WITH DISTRIBUTED CALENDAR INFRASTRUCTURE

CROSS-REFERENCE TO RELATED APPLICATIONS

This application is a Continuation of U.S. patent application Ser. No. 13/625,551, filed 24 Sep. 2012, which is a Continuation-in-Part of U.S. patent application Ser. No. 12/696,623 (issued 13 Nov. 2012 as U.S. Pat. No. 8,312,528) and Ser. No. 12/696,640 (issued 1 Jan. 2013 as U.S. Pat. No. 8,347,372), both of which were filed 29 Jan. 2012, and both of which are divisional applications of U.S. application Ser. No. 11/005,838 filed 7 Dec. 2004, which issued on 13 Apr. 2010 as U.S. Pat. No. 7,698,557 and which claimed priority from U.S. Provisional Application Ser. No. 60/531,865 filed 22 Dec. 2003. This application claims priority of all of these previous applications.

FIELD OF THE INVENTION

This invention relates to electronic document security, in particular, to a system and related method of operation that enables one to verify the authenticity of documents that are in electronic form.

BACKGROUND OF THE INVENTION

The ability to verify the authenticity of documents (defined broadly as any set of digitized information) in the electronic age has become more challenging at the same time it has become more needed. Documents in electronic form are everywhere in modern banking, commerce, government, law, indeed, in modern life in general. In a world where documents are created, submitted, processed, stored, considered, etc., all electronically, sometimes even in multiple locations in the "cloud" unknown to the users themselves, notary or other official seals, physical signatures, special papers and other such tools are becoming increasingly unsuitable and unreliable.

Perhaps the most common way at present to verify the authenticity of electronic documents is to use some form of digital certificate to "sign" them, which is typically accomplished using some form of asymmetric cryptography. Public key cryptography is fast enough to enable almost instantaneous certificate generation. However, there is an inherent weakness in using asymmetric cryptography to create digital signatures: Cryptographic signature keys may become compromised. Once a key has become compromised, the certificates created with that key are no longer verifiable. Since the likelihood that a key will become compromised increases over time, certificates created by using keyed cryptography are useful only for a short term.

One other common method for verification involves publication, including, for example (but not necessarily) proof of an order of receipt using a sequence value bound to the digital record. When publishing is used to make a verifiable binding, the service provider typically publishes a digital record together with a sequence value in a widely-witnessed manner, for example, in a newspaper. If the service provider commits to certain rules regarding publication, then the published content can be relied upon as having been certified by the service provider. Since no cryptographic keys are used in the publication method, the problem of key compromise is not a concern. However, the publication method is inefficiently slow and unsuitable for large document collections. Publication is realistic daily or weekly, but instant certificate creation, though demanded by the modern electronic market, is impossible.

To verify the authenticity of a certificate for a long term, and to do so efficiently, publishing-based bindings and/or multiple key signatures can be used in combination. However, since this combination approach has the disadvantages of both systems, certificates must be regularly updated, creating additional expense to maintain the validity of the bindings.

There is another fundamental problem related to concerns the properties of the sequence values themselves, typically represented as integers. To some extent, verifiable bindings between digital records and integers can be viewed by verifying parties as proof that the records did indeed receive these sequence values.

Often, however, the sequence numbers assigned to digital records do not accurately reflect the real temporal order in which records were received. Malicious service providers may assign sequence numbers to records in any order they so desire. Thus, a need has arisen to detect erroneous behavior of a service provider. The concept of numbering records can be too abstract to reflect the registration process. For example, an assertion that three records were registered before any one particular record does not provide any information about how the records were registered. One way to overcome this problem is to define the sequence value of a particular record as the set of all records preceding a particular record in the repository. Such "sequence values" represent the order of registering, but since they also record the history of the repository, they cannot be denied by the service provider. However, if each sequence value reflects the entire history of the repository, the values may become so large as to make their calculation and transmission impractical.

One way to confirm the history of a service provider is to include a cryptographic digest of all previously registered records in the digital certificate issued to the record-providing party. For example, a linear chain hash may be created by applying a cryptographic hash function to a concatenation of a newly-received record and the record received immediately prior to it. Such a method is disclosed in U.S. Pat. No. 5,136,646 to Haber et al. Cryptographic digests which are included in order certificates create causal, one-way relationships between the confirmations and thus can be used to verify their order without fear of erroneous behavior by the service provider, because any erroneous confirmation is detectable by a verifier examining the one-way causal hash chain. The sequence values created by such processes are shorter because of the use of cryptographic hash functions. However, verifying such values still requires a calculation of all records in the repository, and thus can consume significant processing resources. This process is further disadvantageous because it cannot be performed without interaction with the service provider.

When it comes to verifying the authenticity of digital documents, regardless of whether the user cares about proof of receipt order or not, most existing methods have the serious flaw that users must in some way trust some service provider at some point. In other words, even with a theoretically trustworthy verification scheme, one must then instead trust the entity that performs the verification. The alternative of publishing a digital record along with some verifying information may avoid the need for such trust, but as mentioned above, a pure publication-verification scheme is unsuitable for large collections of documents that each may need authentication for. In other words, one or both of two common problems beset known authentication schemes: either there must be some "trust authority" or the systems are not amenable to extensive scalability.

BRIEF DESCRIPTION OF THE DRAWINGS

FIG. 11 is an illustration of a table for use with the system and method for generating a digital certificate, illustrating the workflow of an algorithm for registering a digital record.

FIG. 12 illustrates one example of the workflow of a procedure for generating a digital interval value.

FIG. 13 is an illustration of an example of a table that can be used in a procedure for generating a digital interval value.

DETAILED DESCRIPTION

As is explained below, the general infrastructure for verifying the authenticity of documents according to this invention has different layers. For the sake of succinctness, the uppermost layer, which will typically be controlled by a service provider or administrator, is referred to here as the "core". Users who submit documents for registration or later verification comprise the lowermost layer, that is, whatever systems they use to input such documents; this will be referred to below as the "input" or "user" layer. In between the user and core layers is an aggregation layer. Again, these are explained further below.

Figure 1:
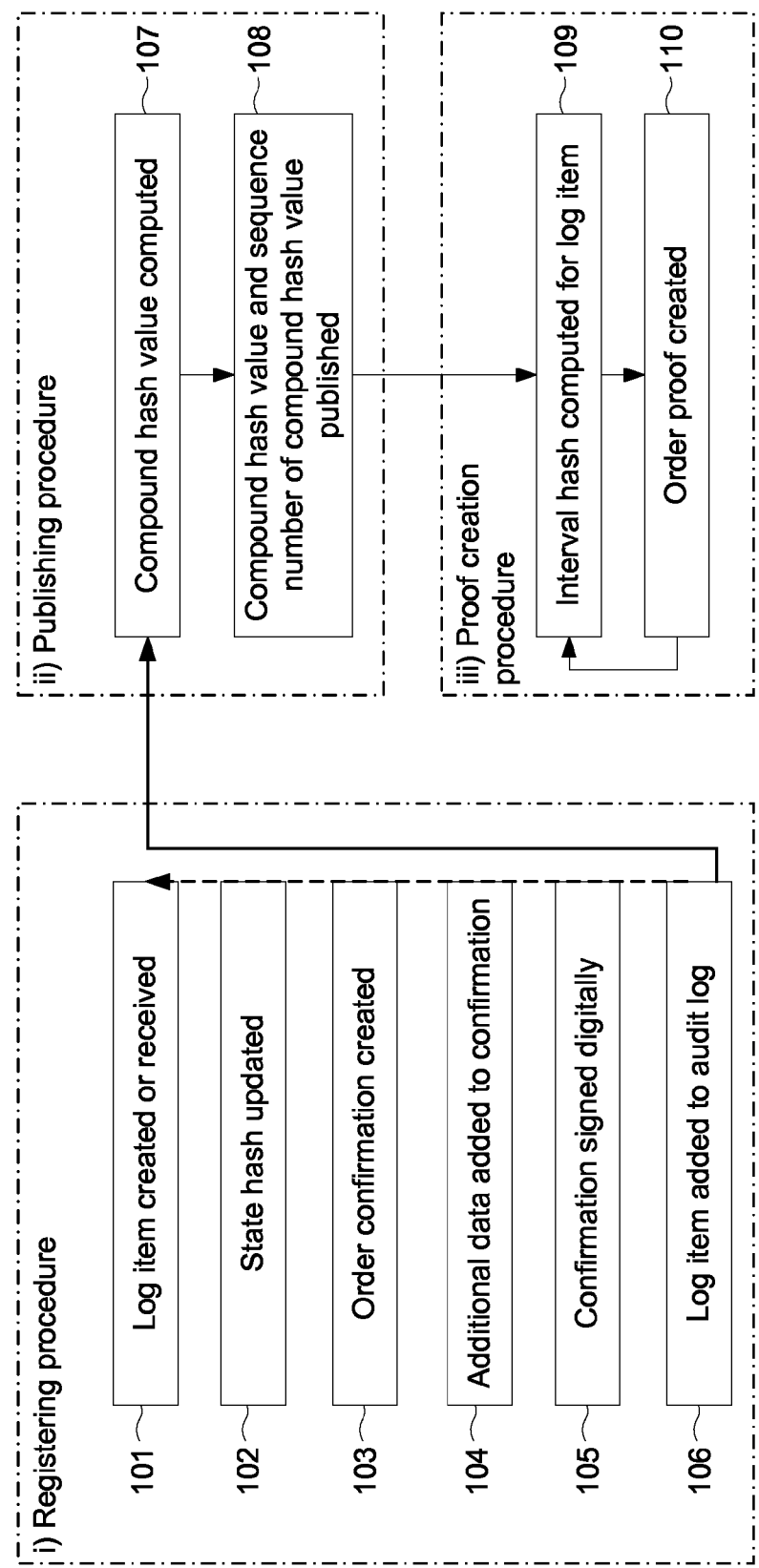
FIG. 1 is the general flowchart of general structure and operation of a "core" portion of a document verification system.

FIGS. 1-13 relate primarily to the core layer. FIG. 1 illustrates three functionalities for the core. The first functionality is the registration of a new digital record. In step 101, the new digital record is created or received. A digital record is a representation of a "document," that is, data item, which can represent any type of digital information. For example, the data item may be an electronic document including text, images, or any other information that can be rendered in digital form, order information, identification information, or any other type of digitally-represented information. As a representation of the data item, the digital record may comprise the data item in its entirety, may comprise a portion of the data item, or may comprise some other representation of the data item. In step 101 a new digital record is either received or is created based on one that is received, and then stored in a repository of digital records.

In step 102, a first deterministic function is applied to at least a subset of the digital records stored in the repository, thereby generating a first composite digital value. In one possible embodiment, the first deterministic function is applied to all of the digital records stored in the repository, thus ensuring that the first composite digital value is a representation of the entire history of the repository and thereby reducing the possibility that the owner of the repository may later tamper with the contents of the repository.

In step 102, a sequence number may be assigned to the new digital record. Such sequence numbers may be required or preferred in some implementations, or may be included just for administrative purposes. The invention here does not require the generation of sequence numbers as such in order to authenticate a given digital record. As will be explained below, however, the core preferably maintains a time base for creating repository composite verification values at known intervals. The time values may be considered "sequence numbers" in such case, if actual sequential ordinal numbers are not included, or are included in addition to time values. Thus, although in one possible implementation the sequence number represents the order in which the new digital record is received, this is not required for the invention to authenticate digital records. In summary, the sequence number can be any representation of the time and/or order (the combined information may be included as a composite value computed in any known way, or as a vector) in which the new digital record is received.

In step 103, a first certificate is generated such that the certificate verifies the receipt of the new digital record. The first certificate comprises at least the sequence number assigned to the new digital record, and the first composite digital value. In one possible embodiment, in which the sequence number indicates the time at, and/or order in which, the new digital record was received, and the first composite digital value represents the history of the repository when the new digital record was received, the first certificate therefore may be used to verify the sequence number.

In step 104, additional information may optionally be added to the first certificate. For example, the first certificate might additionally comprise the new digital record itself or a portion thereof. This inclusion might be useful in verifying that the contents of the digital record were correctly received by the repository but is not required for the invention to authenticate. The additional information might also be a timestamp indicating the precise time at which the new digital record is received In step 105, a digital signature is applied to the first certificate. The digital signature may be any type of signature such that the signature authenticates the identity of the owner of the repository. For example, the digital signature may be based on a private/public key encryption scheme, such as RSA. In one embodiment, the first certificate is digitally signed using a private key of the owner of the repository. Preferably, the first certificate is transmitted to the creator or provider of the digital record. As is explained further below, the verification infrastructure according to this invention does not ultimately rely on any form of trust authority, including for the generation or maintenance of encryption keys; rather, keys are used at this stage of the process only as a temporary measure. Keyless authentication requiring no reliance on a trust authority is made possible by the invention at a later time, which can be as soon as desired based on the trade-off between administrative simplicity and desired speed of permanent and undeniable authentication.

In step 106, the new digital record or a representation thereof is added to the repository. The step 106 of adding the new digital record to the repository may be performed before or after the generation of the first composite digital value in step 102. In one possible embodiment, the new digital record is added to the repository after the generation of the first digital certificate in step 103, so as to reduce the wait time required for the provider of the new digital record to receive the first digital certificate. After the new digital record is added to the repository in step 106, additional digital records may be created or received; in other words, the system may return to step 101.

The second primary functionality of the core is the publication of information pertaining to the repository. In step 107, a second composite digital value is generated by applying a second deterministic function to at least a subset of the digital records stored in the repository. Like the first composite digital value, the second composite digital value represents the history of the repository at a particular time. Although possible, the first and second deterministic functions need not be the same functions. The second deterministic function may, as one design choice, be applied to all of the digital records stored in the repository such that the second composite digital value represents the entire history of the repository, thereby reducing the threat that the owner of the repository may tamper with the repository.

As is illustrated below in conjunction with the discussion of the total infrastructure, one advantageous arrangement of the data structure within the core is as a "Merkle tree" such that the first and second deterministic functions are any known suitable hash functions. Hash functions are well known to anyone skilled in the art of cryptology or document verification, and the Merkle tree structure as such has also been known for more than 25 years.

In step 108, a composite sequence number may be generated to correspond to the order in which the second composite digital value is generated. The composite sequence number thereby is an indication of the temporal quality of the second composite digital value. In step 108, the second composite digital value and the composite sequence number are published, for example, transmitted to a public forum. The public forum may be any source of information that is available to the general public. For example, the public forum may be a newspaper, a magazine, an Internet website, electronic mail, etc. Notice that once these values are submitted to such a public forum, they are essentially immutable and tamper-proof forever: if a set of numbers is published in a well-known newspaper, for example, then it would be necessary to somehow find and alter the published numbers in every publicly distributed copy of the newspaper, or at least in the copy that is later used by the particular party who wishes to verify a particular document.

A third function that the core may be configured to carry out is the creation of a second certificate which proves the authenticity of the sequence number of the new digital certificate. In step 109, a digital interval value is generated, wherein the digital interval value is based upon the first and second composite digital values. In one embodiment, the digital interval value is the result of the application of a third deterministic function (such as a hash function) applied to the digital records stored in the repository between the receipt of the new digital record and the generation of the second composite digital value. Thus, the digital interval value can reflect the history of the repository between the receipt of the new digital record and the publication of the second composite digital value. However, the digital interval value can also be the result of the application of a deterministic function applied to all of the digital records stored in the repository, and thereby reflect the entire history of the repository.

In step 110, a second certificate is generated, wherein the second certificate includes at least the digital interval value and the sequence number of the new digital record. Because the digital interval value reflects the history of the repository since the new digital record was added to the repository, or an earlier time, the digital interval value can thus be used to verify the accuracy of the sequence number. The digital interval value may also be used to renew, i.e., extend, the authenticity of the new digital record. Since the generation of the digital interval value is not based upon the use of encryption keys, the security of the second digital certificate is not subject to encryption key compromise.

Figure 2:
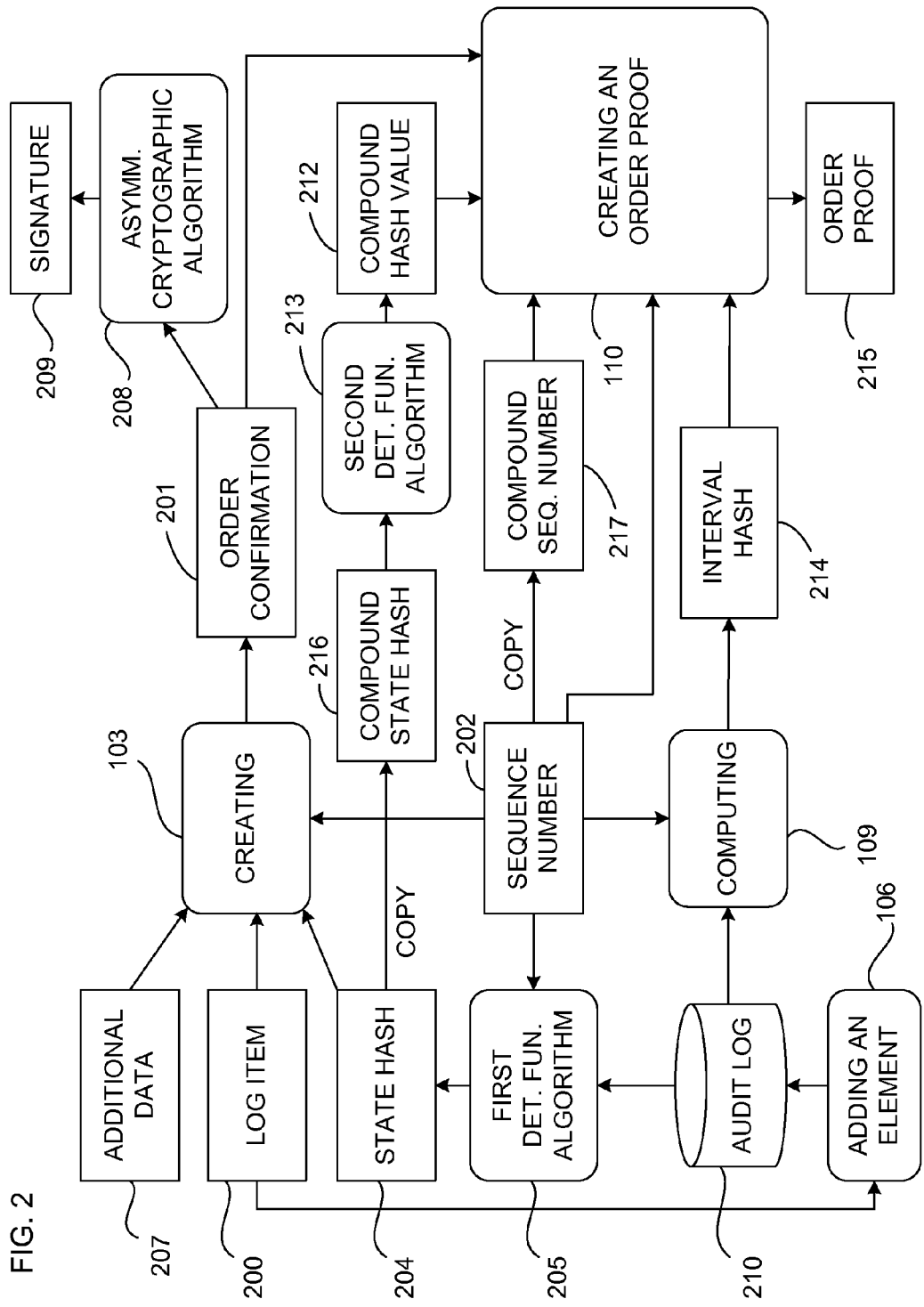
FIG. 2 is a flowchart of a portion of the core, illustrating in greater detail the procedure for registering a digital record in a repository and generating a form of digital certificate verifying the registration of the record.

FIG. 2 illustrates steps for generating a digital certificate. In step 106, the new digital record 200 is added to the repository 210. In step 205, a first deterministic function (such as a hash function) is applied to at least a subset of the digital records stored in the repository so as to produce a first composite digital value 204. The step of adding the new digital record 200 to the repository 106 may be performed either before or after the step of applying the first deterministic function 205 to the repository 210. A sequence number 202 may then be assigned to the new digital record 200, wherein the sequence number represents the temporal value of the new digital record 200, i.e. the order in which the new digital record 200 was received.

In step 103, the first certificate 201 is generated. The first certificate 201 includes, for example, the first composite digital value 204 and the sequence number 202 of the new digital certificate 200. Additionally, the first certificate 201 may include the new digital record 200 itself, and other additional data 207. In step 208, the first certificate 201 is signed with a digital signature 209, wherein the digital signature 209 may be based on a public key encryption scheme.

As explained above, a second deterministic function is applied (shown as step 213) to the digital records stored in the repository 210 to generate a second composite digital value 212. A composite sequence number 217 is generated, and may for example, be set equal to the currently next-available sequence number in the repository 210. In this illustrated example, in step 109, a digital interval value 214 is generated, wherein the digital interval value 214 reflects the temporal difference between the receipt of the new digital record 200 and the generation of the second composite digital value 212. Lastly, in step 110, a second certificate 215 is generated, wherein the second certificate 215 comprises, in this example, the sequence number 202 of the new digital record 200 and the digital interval value 212. Additionally, as indicated in step 110, the second certificate 215 may comprise all or a portion of the first certificate 201, and the composite sequence number 217.

Figure 3:
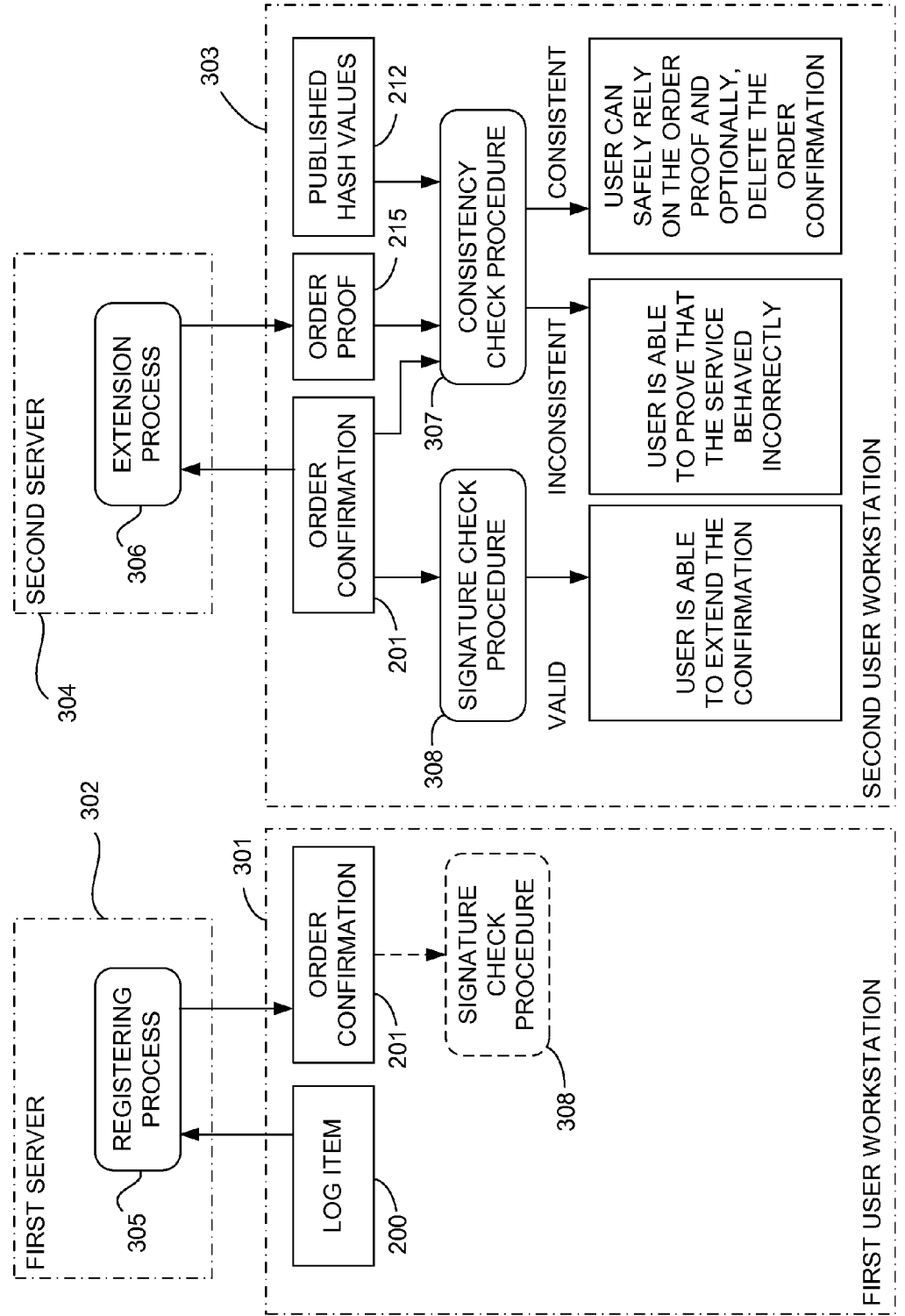
FIG. 3 is a flowchart of a portion of the core, illustrating in greater detail the procedure for generating a certificate proof for a digital record.

Referring now to FIG. 3, there is provided in detail the steps of verifying the second certificate 215. A first certificate 201 is received from server 302 by a client 301, wherein the first certificate 201 was preferably signed with a digital signature 209. Optionally, upon receipt of the first certificate 201, a signature check procedure 308 is performed to initially verify the authenticity of the first certificate 201. The signature check procedure 308 may also use a key-based encryption scheme.

The first certificate 201 is received by a second client 303, and a signature check procedure 308 is performed to verify the authenticity of the first certificate 201. In a preferred embodiment, upon a determination in step 308 that the digital signature 209 of the first certificate 201 is invalid, the second client 303 will be unable to confirm or validate the first certificate 201. Upon a finding that the digital signature 209 of the first certificate 201 is valid, the first certificate 201 is transmitted to a second server 304, at which the first certificate may be renewed, extended, and validated by application of the method herein described for generating the second certificate 215. The second certificate 215 is then transmitted to the second server 304. The published second composite digital value 212 and composite sequence number 217 are publicly available to the second client 303. Thus, based on those values, the second certificate 215 and the first certificate 201, the second client 303 may verify the validity of the sequence number 202 via the verification process 307. Upon a determination that the first certificate 201 and second certificate 215 are consistent, the second client 303 is able to rely upon the authenticity of the sequence number 202 and digital record 200 provided by the first client 301.

Figure 4:
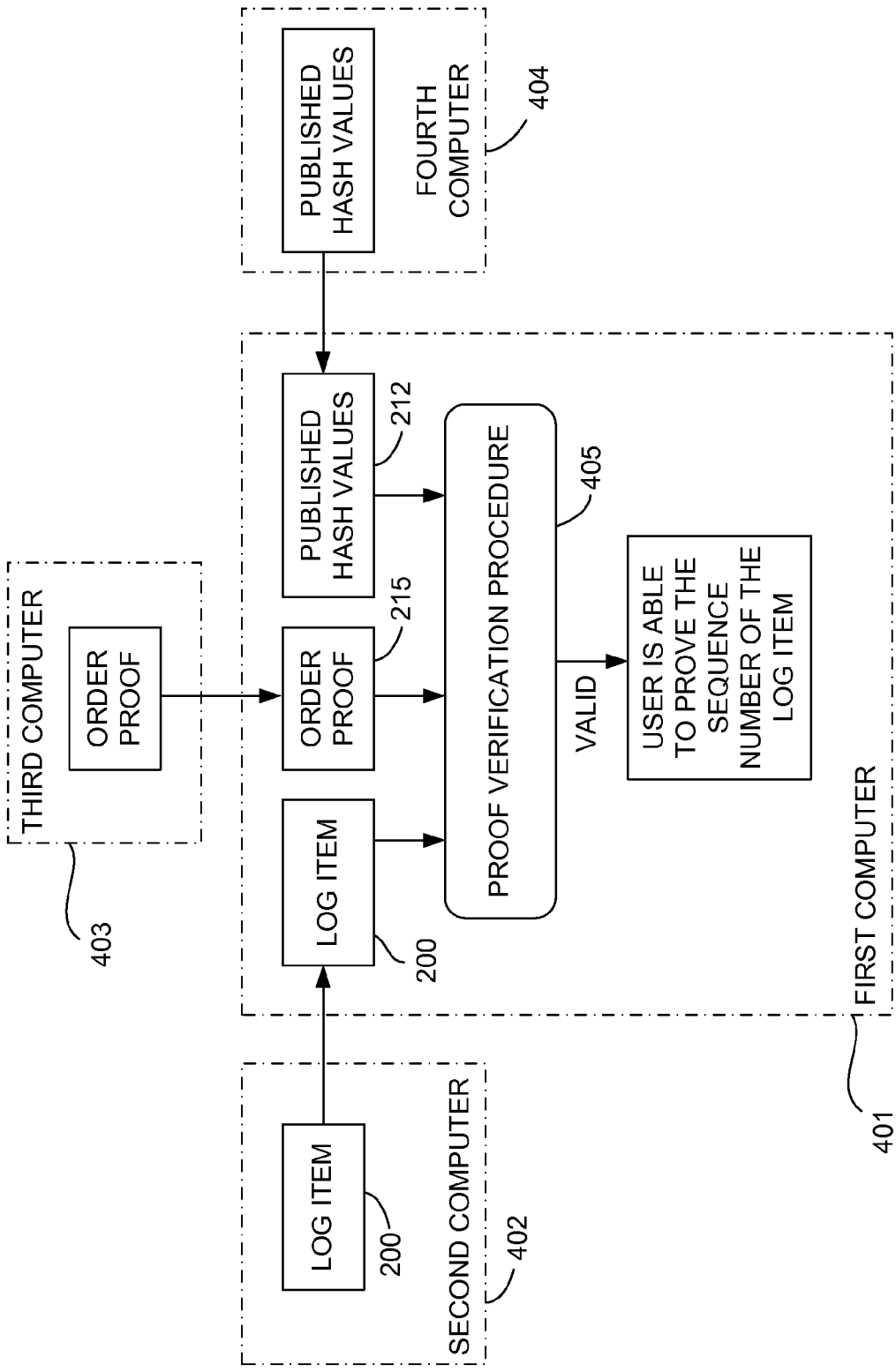
FIG. 4 is a flowchart of one application of the core, illustrating the procedure for using a certificate proof to verify the receipt and sequence number of a digital record.

FIG. 4 illustrates another embodiment for verifying a digital record 200. A digital record 200 is transmitted from a client 402 to a verifying server 401. The second certificate 215 is received from an extension server 403, where the process of generating the second certificate 215 has been performed. The second composite digital value 212 and composite sequence number 217, collectively referred to as the public values 212, are published on public server 404, and are received by verifying server 401. The second certificate 215, digital record 200, and public values 212 are used in the verification process 405 herein described. Thus, the verifying server 401 may rely upon the validity of the digital record 200 submitted by the client 402.

Figure 5:
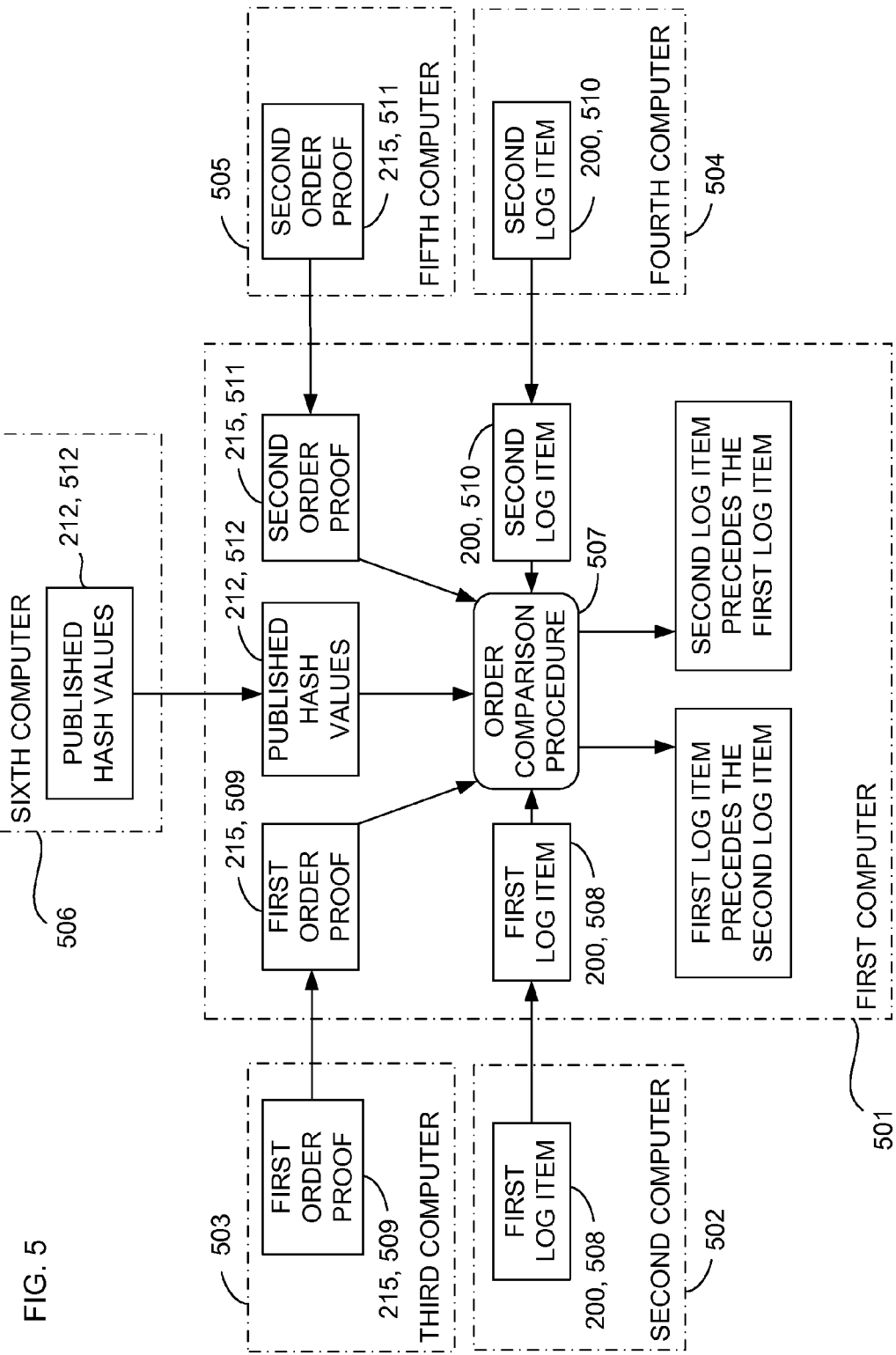
FIG. 5 is a flowchart of one application of the core, illustrating the procedure for using certificate proofs to verify the receipt and sequence numbers of more than one digital record.

FIG. 5 illustrates an embodiment for registering digital records, wherein a verifying server 501 may verify the order of sequence values 202 of competing digital records 200 provided by first and second clients 502 and 504, respectively. A first client 502 transmits a first digital record 503 to the verifying server 501, accompanied by the second certificate 509 corresponding to the first digital record 503. A second client 504 transmits a second digital record 510 to the verifying server 501, accompanied by the second certificate 511 corresponding to the second digital record 510. Thus, the verifying server 501 may use the system and method described herein to determine which of the competing digital records 200 was registered earlier.

The public values 512, published on a public server 506, are received by the verifying server 501. Using the verification process 507 described herein, the verifying server 501 may rely upon the first and second digital records 200 and accompanying second certificates to determine which of the digital records 200 are authentic. Moreover, since the sequence numbers 202 of the digital records 200 are reflected in the second certificates 215, the verifying server 501 may also determine the authentic order in which the digital records 200 were received.

Figure 6:
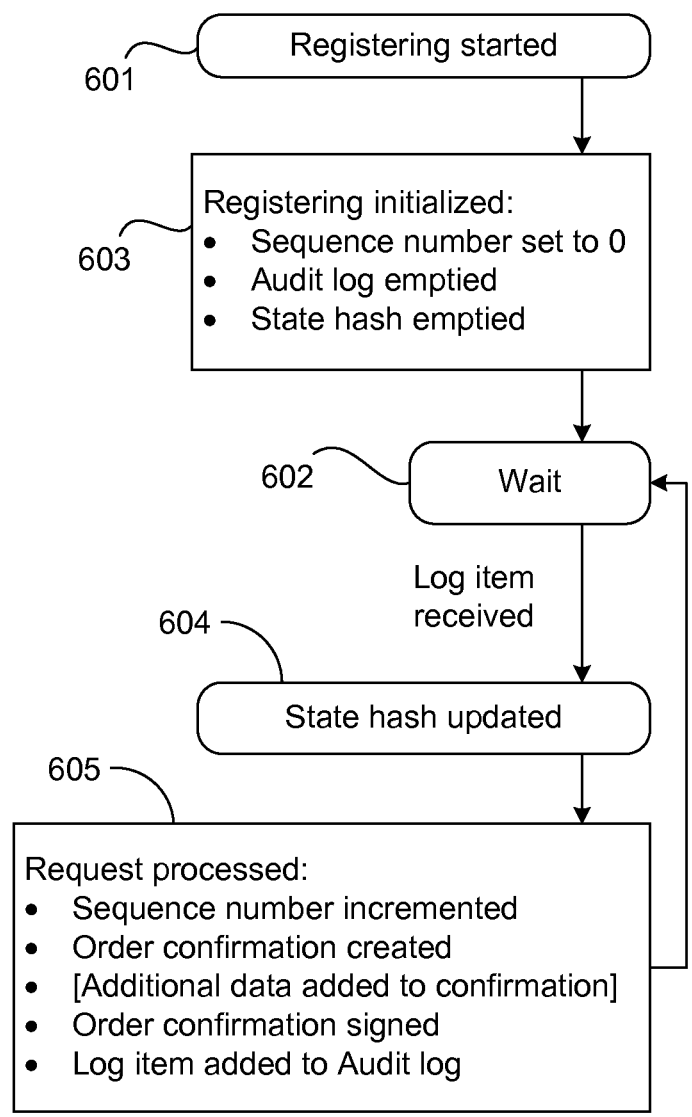
FIG. 6 is a state transition diagram of the core, illustrating the states and state transitions for the generation of a first digital certificate.

FIG. 6 is a state transition diagram that further illustrates the states and transitions therebetween for registering a new digital record and generating a first digital certificate. In step 603, the registration system is initialized. The sequence value is set to zero, the repository is cleared of digital records, and the composite digital values are cleared. In step 602, the system waits to receive a digital record. When a digital record is received, the first composite digital value is generated in step 604. In step 605, a sequence value is assigned to the new digital record, and a first digital certificate is generated according to the procedures described herein. The first digital certificate is digitally signed. Lastly, the new digital record is added to the repository. After registration is complete in 605, the system returns to a state of waiting 602 to receive another new digital record.

Figure 7:
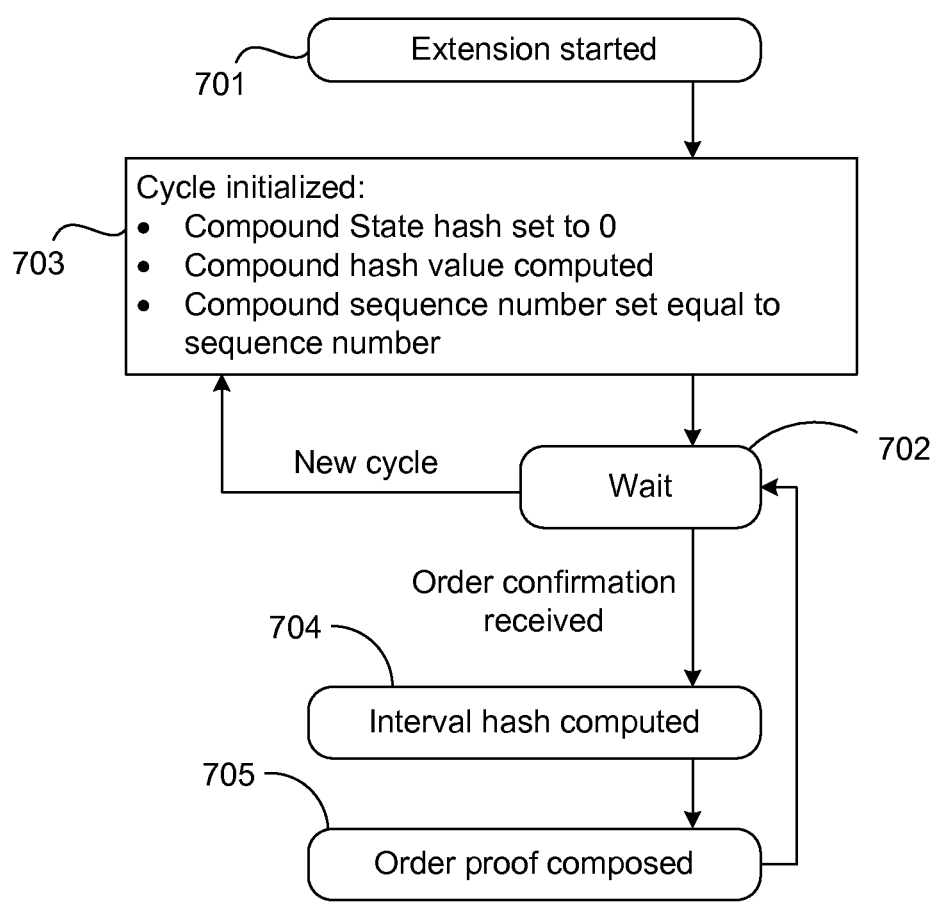
FIG. 7 is a state transition diagram illustrating the core states and state transitions for the generation of a second digital certificate and renewal of a first digital certificate.

FIG. 7 is a state transition diagram that further illustrates the states and transitions therebetween for extending the first digital certificate. The system begins in step 701, and in step 703 the system is initialized. The second composite digital value is generated by applying the second deterministic function to the repository, and the composite sequence value is generated. The system then proceeds to a state of waiting 702 for the receipt of a digital certificate. If no digital certificate is received, the system may intermittently return to step 703 to re-initialize and re-generate the composite values. When a digital certificate is received, the interval digital value is generated in step 704 according to the process herein described. After the interval digital value is generated, the system generates a second digital certificate in step 705. Lastly, the system returns to a state of waiting 702 to receive another digital certificate. In a preferred embodiment, since the generation of the second digital certificate is dependent upon the contents of the first digital certificate, the system may be used to renew or extend the authenticity of the first digital certificate. The system may also be used to verify the authenticity of the first digital certificate, and may also be used to verify the authenticity of the digital record corresponding to the first digital certificate.

Figure 8:
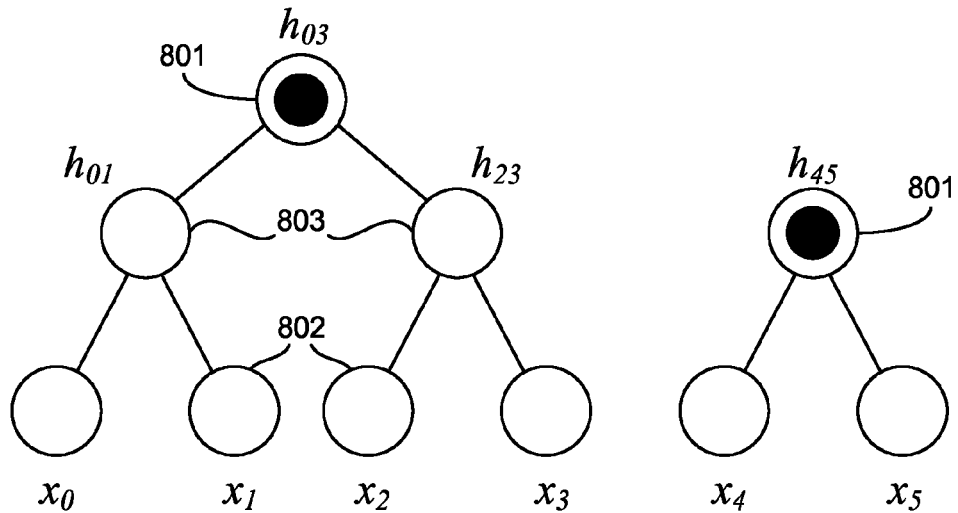
FIG. 8 illustrates a forest of hash trees.

FIG. 8 illustrates a data structure for use with the system and method for verifying the authenticity of digital records. In one embodiment, the data structure is a forest of hash trees wherein every parent vertex of a tree is a cryptographic hash of the child vertices. The construction of the hash tree is performed on the fly, based on the receipt of new digital records. The new digital records are represented by hash values, and are stored as leaves 802 of the hash trees. Because of the use of a tree data structure, the number of digital records stored in the repository need not be known and the topological parameters of the repository, for example, height and width, need not be determined. FIG. 8 thus represents the forest of hash trees data structure of the repository after six digital records have been received.

In the embodiments illustrated in the figures, the hash tree forest is binary, that is, each parent node in the hash tree has two children. It can be shown using known mathematical techniques that this binary tree structure is advantageous from the point of view of storage, simplicity, ease of computation, and speed in traversing it. This invention does not necessarily require the use of a binary hash tree structure, however. It would, for example, be possible to have more than two children for each hash tree node, with suitable adjustment of the internal hashing computations and a corresponding adjustment of the indexing scheme to accommodate more than two input values per hash function. In other words, one could implement this invention using a non-binary hash tree structure, but in almost all instances this would lead to computational inefficiency and bookkeeping difficulty. It is also possible to have a hash tree with only a single entry node. Either the hash function could be applied to the single entry value (digital record), or it could be paired with a "dummy" input value to accommodate a binary hash function and tree structure. In the more detailed description of the input and aggregation process below, it will become apparent to one skilled in the art how to adjust a particular implementation of the invention to accommodate non-binary hash tree structures.

The leaf vertices 802 of the forest are organized naturally. The sequence number n of a leaf determines its position in the forest. If a new data record $x_n$ is received, it is first stored as a leaf with sequence value n and that tree is then updated. The updating process is organized so as to provide that only the root vertices 801 of the forest will participate in future generations of composite digital values. The list of root vertices thus serves a state hash for use in the generation of composite digital values. During the process of generating a composite digital value, any vertex of the structure that can be computed is preferably computed and stored immediately. All leaves 802 are preferably stored in their computational order, for example, corresponding to the post-order traversal of the tree; alternative storage schemes are of course possible as long as suitable bookkeeping is implemented. Since the root vertices 801 already represent the hash values of the leaf vertices 802, the leaf vertices 802 need not be considered in the generation of a composite digital value. Thus, the forest of hash trees data structure provides for very fast processing of the composite digital values.

Figure 9:
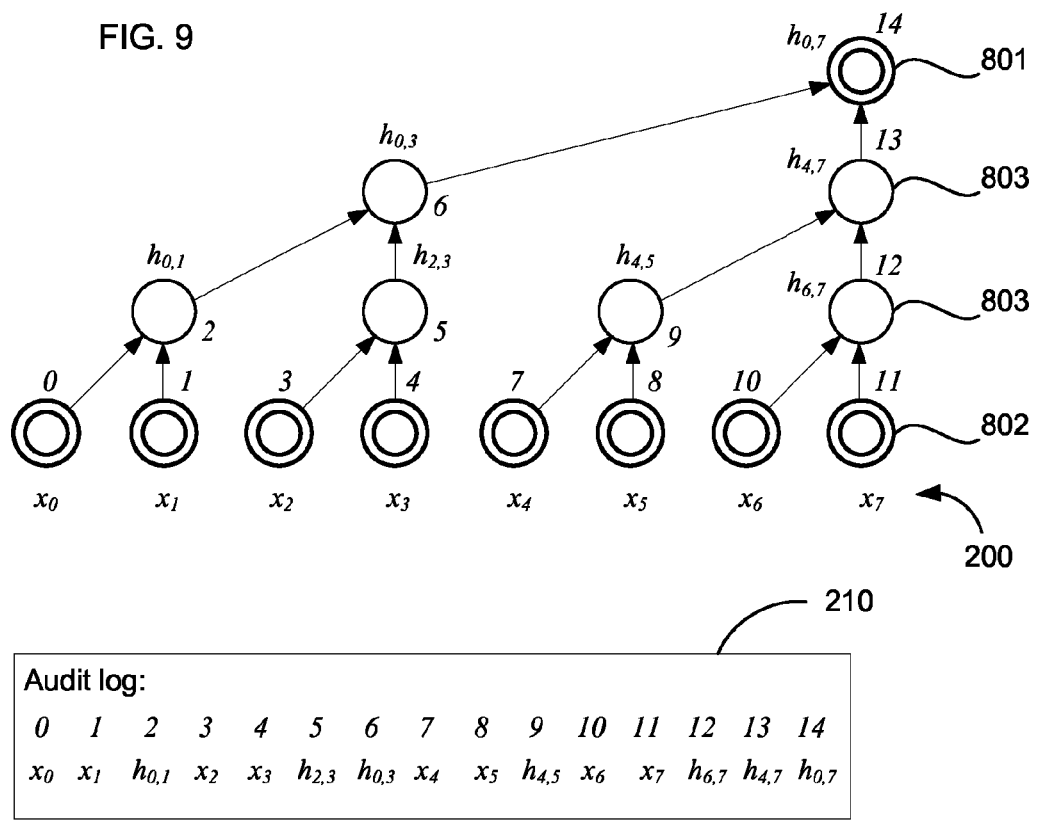
FIG. 9 illustrates a forest of hash trees being represented as an indexed array.

FIG. 9 illustrates the hash tree data structure implemented as an indexed array. The elements of an array representing the forest may be stored in their computational order. Stated differently, the elements computed earlier in time may have smaller indices than the elements computed later, although this is of course a programming design choice. The process of building the forest data structure may, for example, use a stack containing the root hash values $h_1 \ldots h_s$, with $h_s$ on the top of the stack. If $(x_0 \ldots x_{n-1})$ are the leaves of the forest, and if the hash forest is chosen to be binary, the number of elements in the stack is equal to the number of bits set in the binary representation of n. Each added leaf changes some values in the top of the stack, and the number of values being changed is equal to the number of rightmost 1-bits in the binary representation of n. For example, if n=23 the nth addition changes three elements of the stack because $23=10111_2$.

Figure 10:
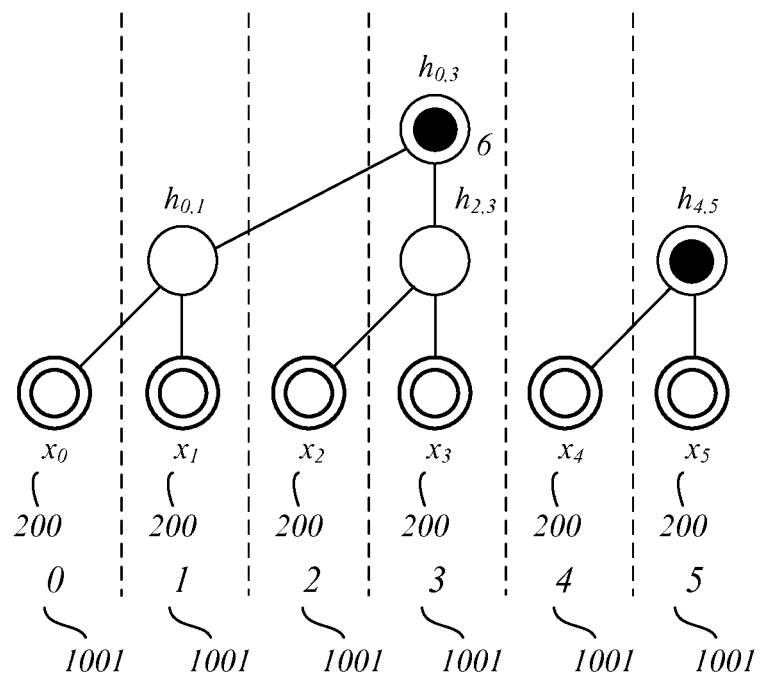
FIG. 10 illustrates a forest of trees arranged in a layered data structure.

FIG. 10 illustrates the hash tree data structure implemented as a layered forest of binary hash trees. Organizing the hash tree in layers allows for efficient calculation of the digital interval value. In the illustrated example, the nth layer 1001 is defined as a minimal subset of vertices satisfying two assumptions: First, for all n, the leaf $x_n$ belongs to the nth layer. Second, if one of the child vertices of a vertex v belongs to the nth layer and the other child belongs to the (n−k)th layer (where $k \in \{0, \ldots, n\}$), then also the vertex v belongs to the nth layer. FIG. 10 depicts an example of a binary hash tree of six nodes organized in layers.

FIG. 11 shows a table that illustrates the workflow of a procedure for registering a digital record, where n represents the sequence number of the repository and x represents a new digital record:

```
Composite_value=[ ], Repository=[ ]
n:=0
repeat
    Receive_Record (x)
    Reply (n, Composite_value, x)
    Append (Repository, x)
    Update (Repository, Composite_value, n, x)
    n:=n+1
```

Depicted in FIG. 11 is a workflow illustrating the application of this algorithm with digital record inputs $[x_0, x_1, x_2, x_3, x_4]$. The function Update (Repository, Composite_value, n, x) may further be defined as:

```
a:=n
while Odd (a) do
    x:=Hash (Pop (Composite_value), x)
    Append (Repository, x)
    a:=a>>1
Push (Composite_value, x)
```

Referring now to FIG. 12, a table is provided illustrating the workflow of an algorithm for use with the system and method for generating a digital certificate. In a preferred embodiment, the algorithm for generating an interval digital value, where n represents the sequence number of the repository and N represents the composite sequence value, is provided as:

```
head:=[ ], tail:=[ ], j:=||n||₁+1, b:=1
while f:=[(n⊕b) or (b−1)]≤N do
    if b&n=b
        Append (head, Repository [2f−j+2])
        j:=j−1
    else
        Append (tail, Repository [2f−j])
        b:=b<<1
```

FIGS. 12 and 13 illustrate the application of this procedure where n=4 and N=7 and n=3 and N=7, respectively.

Figure 14:
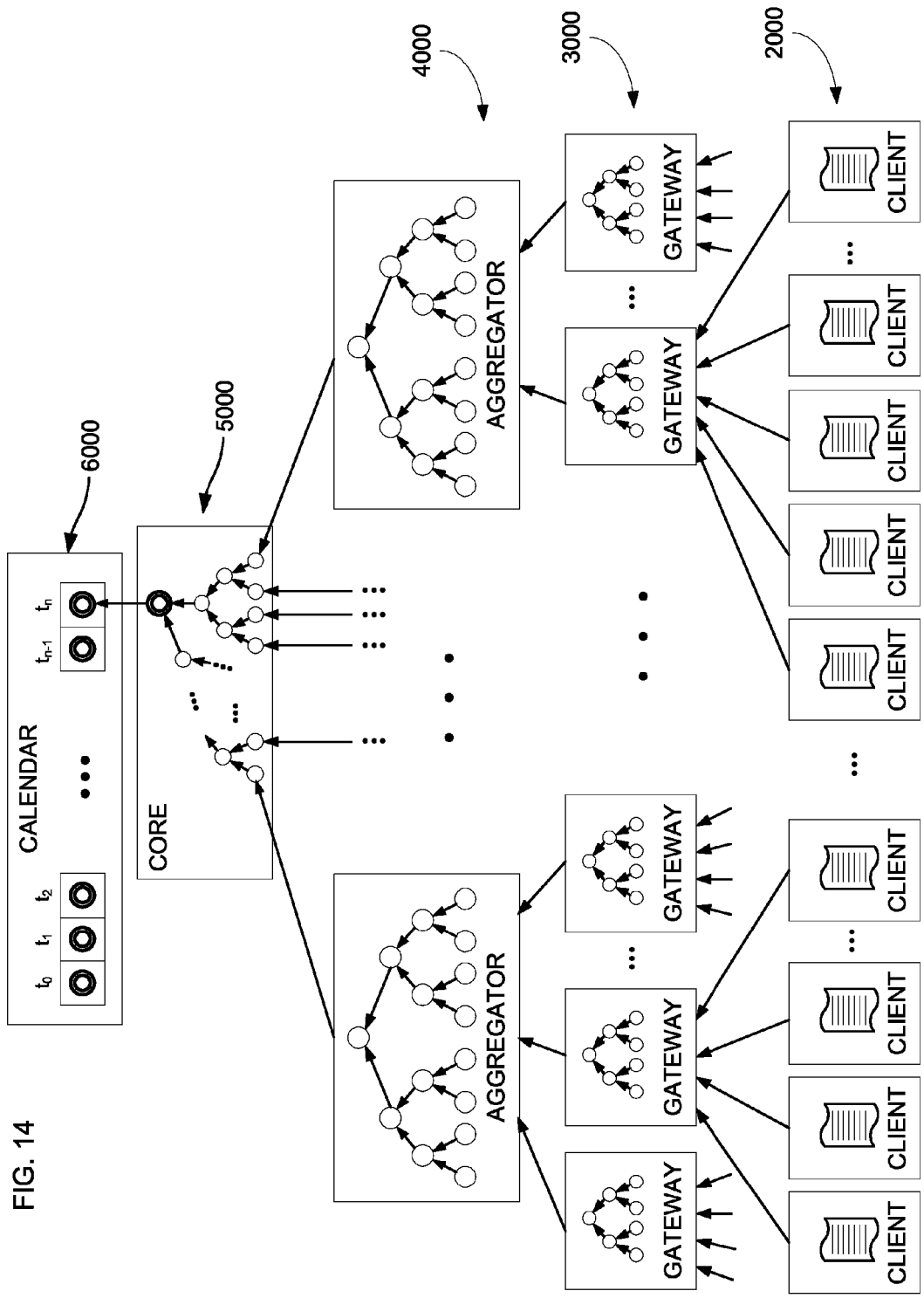
FIG. 14 illustrates various layers of a generalized document verification infrastructure.

FIG. 14 illustrates a general infrastructure that embodies the main ideas of the invention. As FIG. 14 shows, the general infrastructure has several different layers: a client layer 2000 comprising a number of client systems; a layer of gateways 3000; a layer including one or more aggregation systems 4000; and an uppermost layer 5000 that includes the core, which is described in greater detail above. Although FIG. 14 shows the various layers as being separate and distinct, some implementations of the main principles of the invention might consolidate some of the layers or might need to add additional layers for administrative or other purposes. The description below of what the various layers do will make it clear to those skilled in the art of systems architecture design how to implement such changes. As FIG. 14 also illustrates, the core layer 5000 will in general be common to all users of the system, whereas lower layers 2000, 3000, 4000 will in many implementations have a unique configuration depending on the needs and preferences of users. The distinction between "core/common" and "unique/distributed" is not hard and fast, however—in some implementations, the core, that is, centrally administered system, will encompass structures and functions that also are used in lower layers. One of the unique advantages of this invention is that it allows for almost unlimited scalability and reconfiguration of the non-core layers to meet particular implementation needs. All that is required is that the various layers perform the functions described both above and below, with common protocols for entering a digital record (alternatively referred to generally here as a "document") into the verification system and for generating registration requests.

In the illustrated embodiment, a client is the system where digital records are prepared and entered into the verification system. As just one of many possible examples, a client could be a user workstation and the digital record 2012 (any set of binary data to be registered for later authentication, which is referred to generally here as a "document" regardless of its source or form) could be a document that the user or some other system has created with a word processor, or has downloaded and completed from some third-party source, has sent as e-mail with or without attachments, has selected from local or external storage, has converted from one electronic form to another, has scanned in from a physical copy into digital form, has compiled into one or more files of insurance, financial, legal or medical records, laboratory or diagnostic reports (such as X-ray, MRI images, sonograms, etc.), or other test data, or any other of the countless types of digital records that might need to be verified. The digital input record ("document") could even be data representing some or all of the state of the client computer system itself (or of some other system), such as the immediate contents of all or some sub-set of its hard disk, or the whole or partial state of a virtual machine (which might even comprise the client system 2012-1 itself) at an exact time, etc. A document could also be a file comprising digitized sound and/or video files, such as voice or other sound or audio-video recordings. In short, a client is any system where a document of any type is input, created or otherwise presented (with or without human involvement) in digital form such that it can be processed and registered using the infrastructure according to the invention. Generally, a "document" therefore may be anything that can be represented as a set of binary data, regardless of source, manner of creation or method of storage.

A gateway in the gateway layer 3000 will typically be a computer system such as a server with which one or more of the clients communicates so as to receive requests for registration of each document that a client submits. In many implementations, a gateway will be a server controlled by an enterprise or some third-party provider, which may be a server known to and maybe even controlled by an organization to which the client user belongs, or a server accessed through a network such as the Internet. In short, a gateway may generally be any server located anywhere and configured to receive requests from clients for document registration. Gateway systems do not need to be of the same type; rather, one gateway might be a server within a company that employs many clients, whereas another gateway might be a server accessible online by arbitrary users. Of course, gateways could also be commercial systems, such that access for verification is granted only upon payment of a fee.

An aggregator in the aggregation layer 4000 will similarly be a computer system such as a server intended to receive registration requests that have been consolidated by respective gateways. Depending upon the scale and design requirements of a given implementation, any aggregator could also be controlled by the owner of the core, or the owner of the same systems as the gateways and clients, or could be provided by an entirely different entity, and in some cases it would also be possible to consolidate the aggregator and gateways for particular set of clients. For example, one design choice would be for the central system to include a set of aggregators as part of the "core" system, with lower-level, non-core aggregators submitting requests by communicating through the "core aggregators." One could then locate core aggregators geographically, such as one or more aggregators in each of Europe, North America and Asia, to reduce latency or for administrative reasons.

As another example, large corporations or government entities might prefer to implement and benefit from the advantages of the invention using only their own dedicated systems. Nearer the other end of the spectrum of possibilities would be that the gateways and aggregators could all be configured using "cloud computing" such that a user at the client level has no idea where any particular gateway or aggregator is located or who controls the servers. One of the advantages of this invention is that user documents can still be verified with near total security even in situations where users and others do not know if they can trust the systems in the gateway or aggregation layers 3000, 4000; indeed, as will become clearer from the discussion below, it is not even necessary to trust the administrator of the core 2000 in order to have essentially total reliability of verification.

Figure 15:
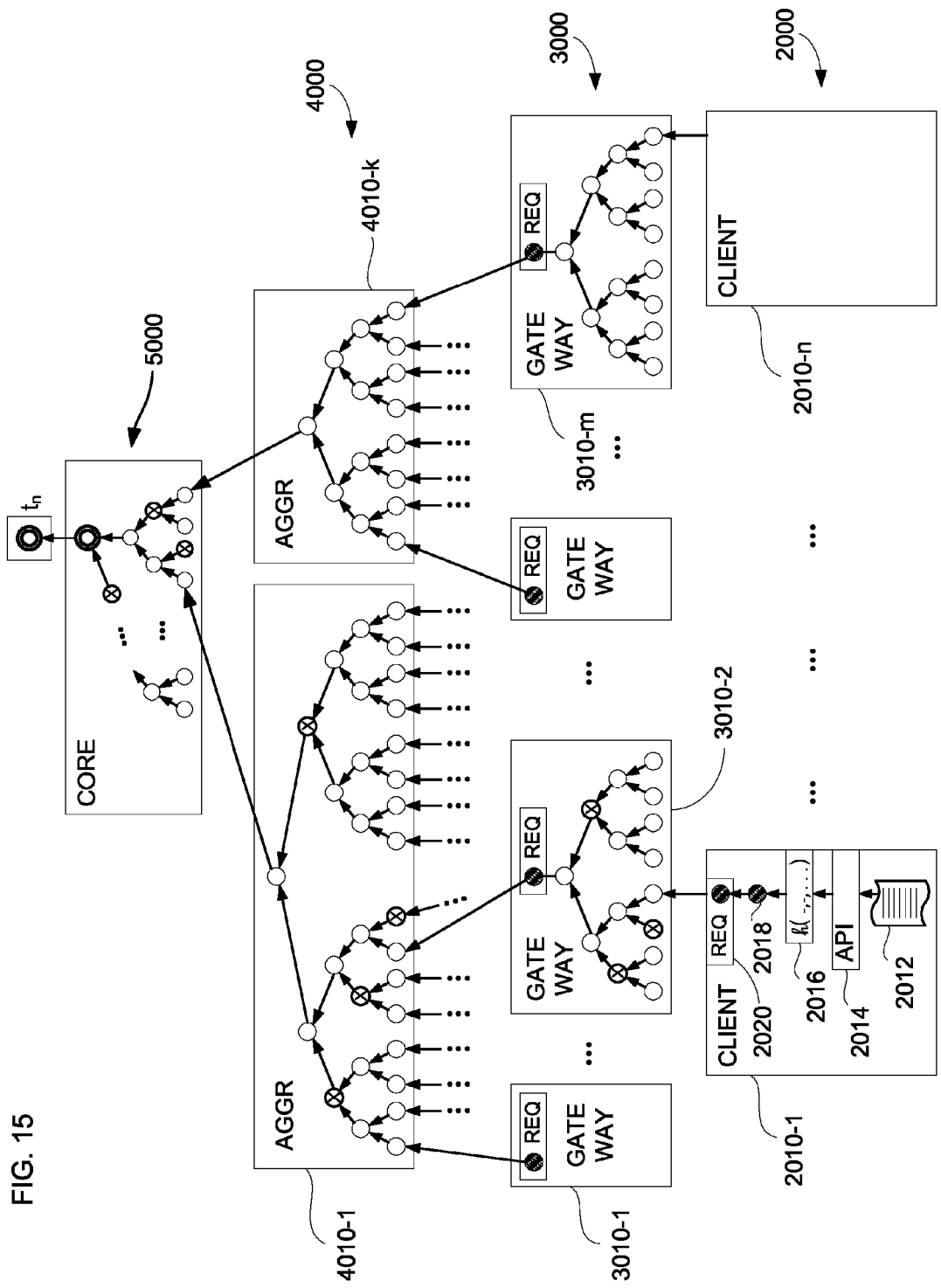
FIG. 15 illustrates an infrastructure, and various data structures maintained and computed within the different layers.

FIG. 15 shows the infrastructure of FIG. 14 in more detail. In particular, FIG. 15 illustrates various data structures used in the authentication process. In FIG. 15, the various clients are represented as 2010-1, . . . , 2010-$n$; gateways are represented as 3010-1, 3010-2, . . . , 3010-$m$; and two (by way of example only) aggregators are shown as 4010-1, 4010-$k$. An aggregator will typically communicate into each of the lowest level hash tree nodes within the core. Only two aggregators are shown in FIG. 15 for the sake of simplicity.

Consider the client system 2010-1. In one implementation, each client system that wishes to use the verification infrastructure is loaded with a software package or internal system routines for convenient or even automatic (for example, where the "document" is a record indicating the state of some system component itself, such as some portion of disk storage, virtual machine state parameters, etc.) communication and submission of digital records. The software package may include some application program interface (API) 2014 that transforms submitted digital records into a proper form for processing. A digital record 2012 created, selected, or otherwise input in any way is then submitted by way of the API 2014 to a software module 2016 that uses the digital data from the record 2012 as at least one argument in a transformation function such as a hash function.

Cryptographic hash functions are very well known in many areas of computer science and are therefore not described in greater detail here. Just one of many possible examples of a common class of hash functions that are suitable for use in this invention are the "Message Digest" (MD) hash functions, which include the MD2, MD3, MD4, MD5, . . . functions and the various "secure hash algorithm" (SHA-1, SHA-2, etc.) family. As with other cryptographic hash functions, it will normally be preferable to choose hash functions that exhibit pre-image resistance, some kind of second pre-image resistance (which will avoid at least some simple forms of backdating attacks) and collision resistance.

Other arguments used in the transformation function may be included depending on the design protocol of the infrastructure. Just a few of the many possible arguments the system designer might optionally choose to include as arguments of the hash function are an identifier of the person or entity requesting registration, an identifier of the particular client system being used, a time indication, information relating to the geographic location of the client or other system, or any other information desired to be incorporated as part of the registration request. Since the transformation function 2016 will generally (but not necessarily—again, more complicated schemes may be used as long as corresponding bookkeeping for the required data structures is implemented and maintained) output a single number or vector 2018 regardless of the number of input parameters; later authentication through recomputation will succeed as long as the function 2016 is known. A software module 2020 is preferably included to transmit the output of the transformation 2016 to higher layers of the infrastructure as a request (REQ), along with any other parameters and data necessary to communicate with a gateway and initiate the registration request.

It is assumed in this discussion that the transformation function 2016 is a hash function because this will be the most common and efficient design choice, and also because the properties of hash functions are so well understood; moreover, many different hash functions are used in the field of cryptology, security, and often even for memory management within commodity computers. One other advantageous property of hash functions is that they can reduce even large amounts of digital information to a size that is more easily processed, with a statistically insignificant chance of two different inputs leading to the same output. In other words, many well-known hash functions will be suitable for use throughout the infrastructure of this invention, and can be chosen using normal design considerations. Nonetheless, the function that transforms digital records into a form suitable for submission as a request need not be a hash function as long as its properties are known. For example, especially for small documents, it may be more efficient simply to transmit the document data as is, in its entirety or some subset; in this case, the transformation function may simply be viewed as an identity function, which may then also append whatever other additional information is needed according to the core system administration to form a proper registration request. Other non-hashing transformations might be different types of encryption, which can of course be combined with hashing if desired. A later user wishing to authenticate the document would then need to know the encryption algorithm applied before submitting the original registration request, but this is a design choice at the user level—the infrastructure according to the various embodiments of this invention do not "care" what set of digital information is being registered for later authentication and work just as well regardless.

The data structure of a binary hash tree is illustrated within the gateway 3010-2. Each of the lowest level nodes will correspond to the transformed dataset 2018 submitted as a request from a client, along with any other parameters or data used in any given implementation to form a request. As illustrated, the values represented by each pair of nodes in the data structure form inputs to a parent node, which then computes a combined output value, for example, as a hash of the two input values from its "children" nodes. Each thus combined output/hash value is then submitted as one of two inputs to a "grandparent" node, which in turn computes a combined output/hash value for these two inputs, and so on, until a single combined output/hash value is computed for the top node in the gateway.

Aggregators such as the system 4010-1 similarly include computation modules that compute combined output values for each node of a hash tree data structure. As in the gateways, the value computed for each node in the aggregator's data structure uses its two "children" nodes as inputs. Each aggregator will therefore ultimately compute an uppermost combined output value as the result of application of a hash function that includes information derived from the digital input record(s) of every client that submitted a request to a gateway in the data structure under that aggregator. Although it is of course possible, the aggregator layer 4000 does not necessarily need to be controlled by the same system administrator that is in charge of the core layer 5000. In other words, as long as they are implemented according to the required protocols and use the correct hash functions (or whatever other type of function is chosen in a given implementation), then the client, gateway, and aggregation layers may be configured to use any type of architecture that various users prefer.

In one embodiment, the core 5000 is maintained and controlled by the overall system administrator. Within the core, a hash tree data structure is computed using the root hash values of each aggregator as lowest level inputs. In effect, the hash computations and structure within the core form an aggregation of aggregation values. The core will therefore compute a single current uppermost core hash value at the respective tree node 5001 at each calendar time interval t0, t1, ..., tn. This uppermost value is referred to here alternatively as the "calendar value" or "current calendar value" for the time interval. Note that the time origin and granularity are both design choices. In one implementation, for example, the time origin was at time 00:00 on Jan. 1, 1970 and one-second time intervals were chosen. Although it will be more convenient for administrative reasons, it's also not essential for time intervals to be constant, but rather could be adjustable. For example, one alternative design choice could be to compute a calendar value when some minimum number of requests have been submitted, possibly combined with some maximum waiting time. As is explained below, one advantage of using fixed time intervals—even precisely timed intervals—is that it enables later time verification to within the granularity of the chosen calendar time interval.

Note that the tree node 5001 represents the root node of the entire tree structure of nodes junior to it. As is explained later, this will change upon recomputation of a new uppermost core hash value at the end of the next period of accumulating requests and generating signature vectors ("also referred to as "data signatures") containing recomputation parameters. Viewed in terms of graph theory, the hash tree data structure illustrated in FIG. 15 is an arborescence, that is, a directed graph in which, for a node u called the root and any other node v, there is exactly one directed path from u to v and where each node has zero or more children nodes and at most one parent node.

Other arrangements would, however, be possible. For example, to reduce or eliminate single-point-of-failure possibility, it would be possible for requests to be sent upward to and hashed into multiple aggregators as long as some mechanism is included to arbitrate between and/or consolidate the then multiple root hash values that include the lower level's root hash value. Alternatively, requests could be submitted upward to multiple aggregators (or from clients upward to multiple gateways, etc.) and handled by whichever system first accepts it.

In FIG. 15, certain ones of the hash tree nodes in the gateway 3010-2, the aggregator 4010-1, and the core 5000 are marked with an "X". Notice if one traverses the various tree paths upward from the value 2018 in the client 2010-1, it is possible to compute every value upward in the tree structures all the way to the most current uppermost core value 5001 given the values in the X-marked tree nodes (the siblings of the nodes in the direct recomputation path) and a knowledge of the hash functions applied at each successive parent node. In short, if a signature is associated with the digital record 2012 that includes all of the "X marked" values, and assuming predetermined hash functions (which may of course be the same or different functions), then re-computation of the hash values upward through all of the tree structures will yield the same value as in the current calendar value 5001, but only if the starting input value representing the original digital record 2012 is in fact identical in every respect to the original. Even the slightest alteration to the digital input record of even a single bit in any of the values of the signature associated with a record 2012 will lead to a recomputed calendar value that is not identical to the one in node 5001. Note also that each uppermost computed value in the core—the current calendar value—contains information derived from every digital input record that is input into the system during the current calendar time interval.

Figure 16:
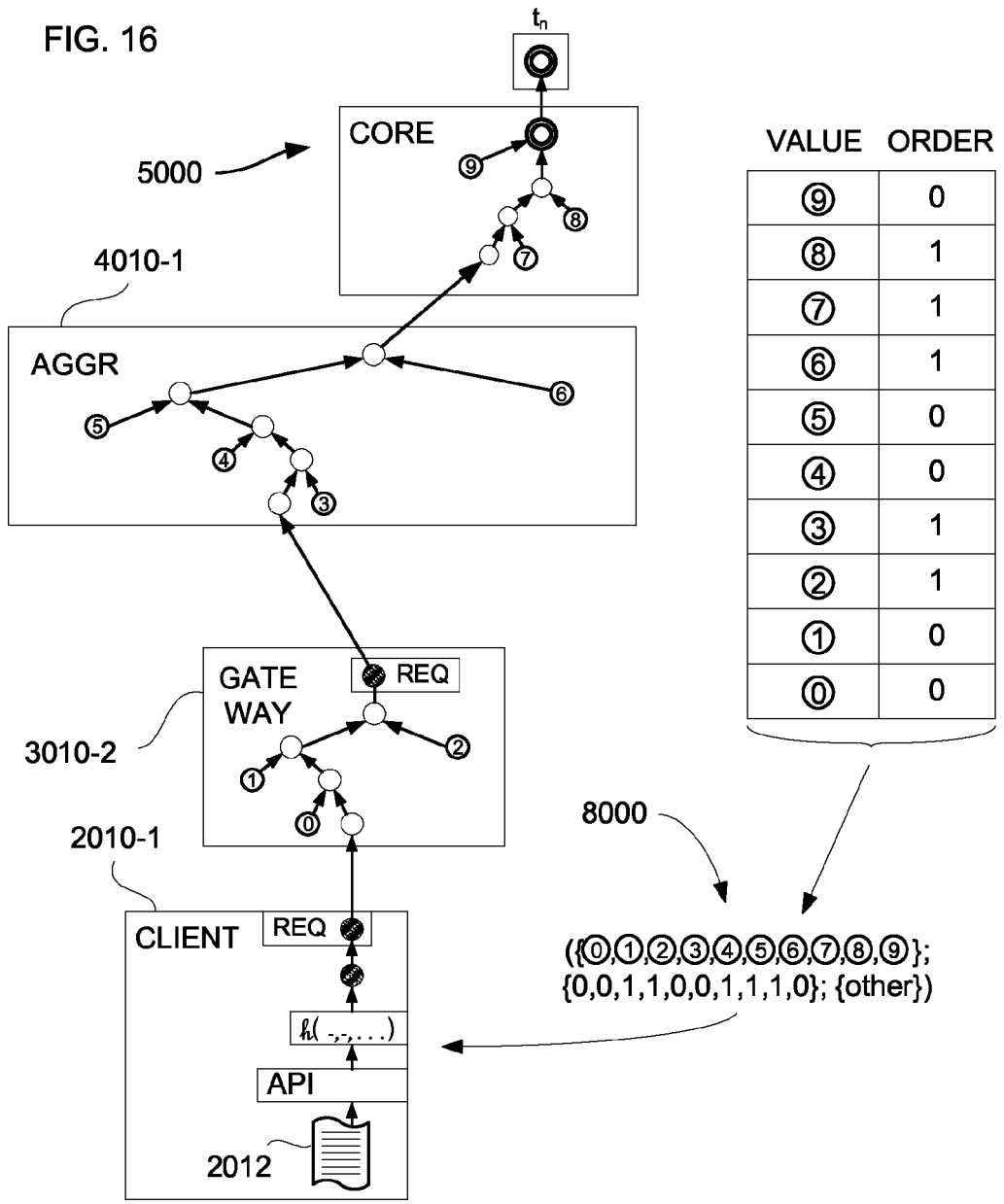
FIG. 16 shows a subset of FIG. 15 to illustrate a digital signature and recomputation of authentication values using the signature.

FIG. 16 illustrates the "reduced" infrastructure whose hash tree node values contain the information necessary to recompute the hash tree path all the way to the top of the system to the value in node 5001. It is not necessary for the recomputation to be carried out in any gateway, aggregator or the core; indeed, it is not even necessary for recomputation to take place within the same client 2010-1 that originally submitted the verification request for the document 2012. All that is necessary is the vector containing the "sibling" tree values at each level, as well as knowledge of which hash functions are used to compute each parent node. In other words, given this information, even a third-party would be able to perform the recomputation and compare with the node value 5001 and thereby either authenticate any given representation of what is supposed to be digital record 2012, or to detect any difference.

In FIG. 16, the sibling hash values needed for recomputation are numbered 0-9. If nodes are created in time order, and if order is important in the chosen hash function, then whether a sibling at each level is to the "right" or "left" in the hash structure will be relevant. In the example shown in FIG. 16, not only the value but also the order (0: from left, 1: from right) is indicated in the vector ({sibling values 0-1},{order bits},{other}) returned along with any other chosen information as the data signature 8000. At this point, one may see one advantage of using a binary hash tree structure: at each level, there will be only one sibling value needed for upward recomputation. Although a non-binary tree structure would be possible, one would then have to accept the increased computational, storage, and data-structural complexity. Comparing FIG. 15 and FIG. 16, one can also see that the computational burden to validate one of a set of N digital input records at any given time interval is proportional to only $\log_2 N$. To increase independence of the various layers—in particular, clients and later entities wishing to perform authentication through recomputation—it is advantageous for the entire calendar to be passed to the aggregators and even to the lower layers, even as far as to clients, every time a new calendar value is computed, that is, at the end of each calendar time interval. This then allows delegation and distribution of the computational workload without any compromise of the integrity of the system. Although it would be possible just to pass down the current calendar value if aggregators maintain a running database of calendar values, the entire calendar will typically not be large and can easily be transmitted entirely each time a new entry is computed. FIG. 14 therefore shows a database or file (the "calendar") 6000 that includes all calendar values from the beginning of system time. This would allow new aggregators, gateways and clients to join the infrastructure with minimal administrative burden and would enable recomputation and authentication of any document without having to involve levels higher than the client-level entity wishing to authenticate the document.

The core may return the data signature vector 8000 to clients and/or other layers directly, or it can be constructed or passed "downward" as a return. For example, when the core computes the current calendar value 5001 at the new calendar time interval, it may return to aggregator 4010-1 its sibling (X-marked) lowest core node value from aggregator 4010-$k$, and the aggregator 4010-1 can then return downwards the X-marked hash values to the gateway 3010-2, which in turn can return downwards to the client 2010-1 all of the above, plus the X-marked hash values computed within that gateway's hash tree structure. In other words, not only may the hash computation infrastructure be distributed over various layers (vertically) and also "horizontally" at each layer, but the responsibility for communicating requests upward and partial or entire signature vectors downwards can also be distributed and can be carried out simultaneously in many different locations. Of course, since a data signature is unique to the document that led to it, the procedure for returning a signature vector for each input document 2012 for client 2010-1 (note that a single client may input more than one digital record for verification in each time interval) is preferably duplicated for all digital input records received in the time interval over which values were accumulated for the computation of node value 5001.

Note that the nature of the distributed infrastructure shown in FIG. 15 and described here does not need to be static from one time interval to the next. Rather, each of the components below the core can be built asynchronously and independently of others; all that is needed for authenticating recomputation from a digital record up to the corresponding calendar value is the transformation function and other values that made up the original request, the vector of hash tree sibling values and knowledge of which hash functions are to be applied at each computation. Of course, the simplest case would be that the same hash function is used at every level. A somewhat more complicated choice would be to use the same hash function for all computations on a given level (within clients, within gateways, within aggregators, etc.) with variation between levels. Other even more complicated choices may of course be made as will be realized by those skilled in the art of such data structures and hash function computations. As long as the hash function used for each computation is known, the infrastructure will be able to validate a given input record.

In most cases, it is unlikely that the number of clients during a given computation interval will be exactly equal to a power of 2. Any known method may be used to adapt to the actual number of clients while still maintaining a binary hash tree structure throughout. As just one example of a solution to this, known dummy values may be used for all of the "missing" sibling node values. Alternatively, it is also possible to adjust the hash tree branches accordingly, in the manner of giving "byes" in single-elimination sports tournaments.

In one embodiment, the gateways 3000 may be more local to various clients whereas the aggregators are more regional. For example, it would be possible to locate aggregators in different parts of the world not only to distribute the workload, but also to increase throughput. Although it appears in FIGS. 14-16 that clients are associated with a particular gateway and gateways are associated with a particular aggregator, this is not necessary. Rather, client requests could be submitted over a network, and the first gateway that responds could then be associated with that client for that authentication transaction. Similarly, requests from gateways could be submitted to an open network and processed by whichever aggregator first establishes a connection. Locating aggregators and gateways both physically and logically in an efficient manner will therefore typically better distribute workload and reduce latency. This may not be desired in other implementations, however. For example, entities such as the government, defense contractors, or companies that wish to maintain strict security and tight control of the entire infrastructure could control and specify the relationship between all of the layers of the infrastructure, or any subset of these.

Assume now by way of example that some entity later wishes to verify that a document in question—a "candidate document"—is an identical copy of document 2012. Applying the same transformation function 2016 to the candidate document and recomputing upward using the corresponding data signature 8000, the entity should compute to the exact same calendar value that resulted from the original document's registration request. In some implementations, this level of verification is sufficient. As one possible example, if the calendar is distributed to enough independent aggregators, then if one malicious actor were to tamper with some calendar value, this could be detected if some procedure is implemented to compare with other copies of the same calendar.

As another example, in some implementations, users may choose or be obligated to rely on the security of the administrator of the core. In particular, government entities might implement a system in which users must simply rely on the government administrators. In these cases, recomputation up to the corresponding calendar value may be considered sufficiently reliable authentication. In the context of this invention, this can be viewed as "first-level" verification. One hypothetical example of where such a system might be implemented would be where a government agency requires companies, laboratories, etc. to submit a copy of its calendar to the government entity every time the company's system updates its calendar. The government would then be able to audit the company's records and verify the authenticity of any given document by recomputing up to the proper calendar value, which the government will have stored. In practice, this would amount to requiring the company to keep updated a "calendar audit trail" with the auditing entity (such as the government).

Even in other instances, as long as the highest level system administrator trusts its ability to securely store calendars, it could be satisfied that a candidate document is authentic if recomputation leads to the appropriate stored calendar value. In a sense, it would be the system administrator itself in such cases that is looking for proof of the authenticity of candidate documents as opposed to clients or other third-party entities. Consequently, the system administrator could trust the security of the recomputation and calendar values to the same extent it trusts itself to maintain the calendar copies.

All but the last document requesting registration in a calendar time period will of course need to wait for all other requests in the calendar time interval to be processed before a calendar value will be available that will enable authenticating recomputation. If the calendar time interval is kept short enough, this delay may be acceptable. To increase the level of security during the delay, it would also be possible to implement an option, whenever a client submits an authentication registration request, to generate and return not only the data signature vector but also a key-based signed certificate, which may be issued by any higher layer system such as the current gateway, aggregator, or even core.

Figure 17:
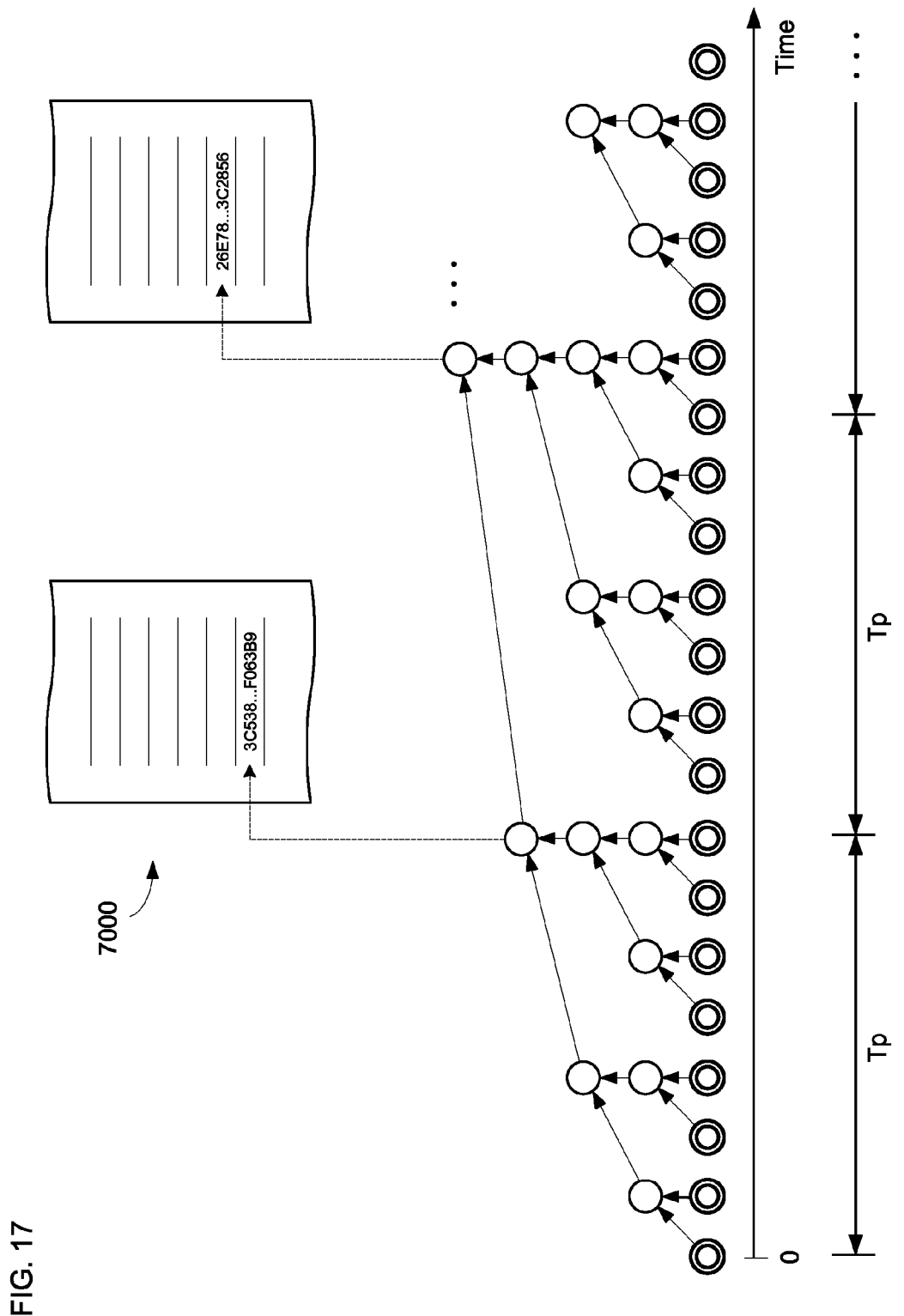
FIG. 17 illustrates publication to create a permanent trust-free authentication feature.

FIG. 17 illustrates extension of the basic calendar-reliant verification process that provides "second-level" verification that is a method for permanent verification with no need for keys or trust of any entity, not even the administrator of the core. In FIG. 17, all of the calendar values computed over a publication time interval Tp are themselves used as inputs to an additional hash tree structure that is preferably hashed together (for example, using a Merkle tree structure as illustrated in FIG. 17) with previous calendar values to compute a composite calendar value (a "publication value") that is then submitted for publication in some medium 7000 such as a newspaper, online posting, etc., that forms an unchangeable record of the composite calendar value. Here, the term "unchangeable" means that it would be practically impossible for even the most malicious actor—even if this is the core administrator—to alter every publicly available occurrence of the value. It is not necessary for "published" to be in any medium accessible to the general public, although this is of course one option that removes all need for a trusted authority; rather, a large or perhaps closed organization that implements the entire infrastructure on its own might simply choose to keep a database or journal of the composite calendar values in some secure logical or physical location.

Because of the various data structures and procedures of the distributed infrastructure of this invention, the published composite calendar value may encode information obtained from every input digital record over the entire publication time interval, and if the current calendar value for the current calendar period is hashed together with the previous one, which is hashed with the one before it, and so on, as shown in FIG. 17, then each published composite calendar value will encode information from every digital record ever submitted for registration from the beginning of calendar time at t0. This guarantees the integrity of the entire system: Changing even a single bit in a single document registered in the past will cause a different publication value to be computed, which would then not match the actual publication value. Once the composite signature value is published (that is, the publication value), there is never again any need to temporarily associate any signed digital certificate (which might be provided as before to increase security until the composite value is published, at which point it will not be needed) with the signature vector of the corresponding digital input record; rather, using the data signature vector and the calendar values (which are advantageously stored in each of the aggregators), one can then recompute hash values upward from any digital input record all the way to the published value. If the digital input record used in such recomputation leads to a match with the published value, then one can be certain to within the degree of certainty of the hash functions themselves that the digital input record being tested is identical to the one that originally received the corresponding signature vector.

Figure 18:
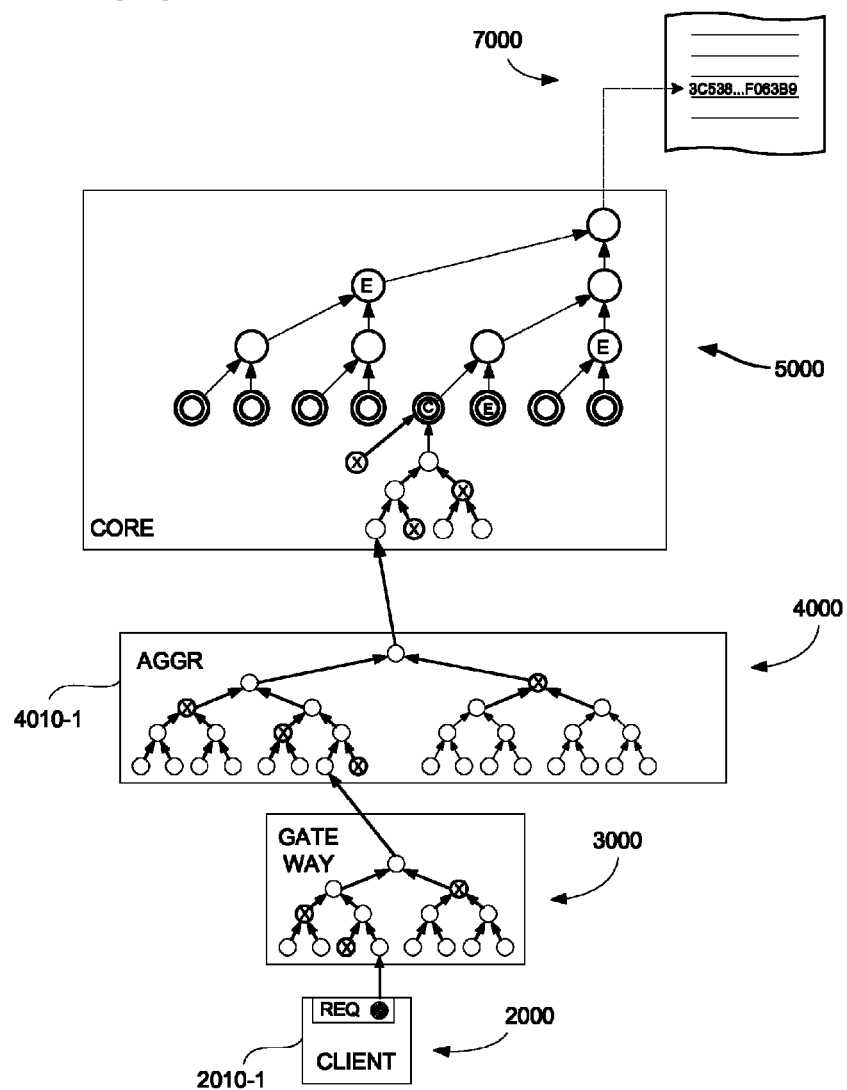
FIG. 18 illustrates extension of a digital signature to enable system-independent authentication by recomputation.

FIG. 18 illustrates an optional extension of the signature vector to include the values obtained during computation of the publication value as well. Assume as before that the "X-marked" nodes are the sibling hash values for the document corresponding to the request REQ from client 2010-1. The X-marked values are sufficient to recompute the calendar value marked "C", but the hash values in the nodes marked "E" in the data structure (in FIG. 18, the Merkel tree structure) within the core that converts calendar values into the publication value are necessary to recomputed all the way up to the published value 7000. At the end of the calendar period, the core therefore preferably extends or augments the signature vectors to include the "E" values, along with corresponding order bits as previously. With such an extended signature, any party can verify the authenticity of a given document as long as it has the extended signature vector, knowledge of the hash (or other) functions used, and the corresponding publication value—if recomputation leads to a match, then the document must be identical to the original; if not, then something has been altered. Note also that any change of order in the time of receipt for any to digital input records will also affect the computed values in the core as well as the published composite signature value.

In FIG. 17, eight calendar values are shown in each publication time interval Tp. In other words, in the illustration, the number of calendar time intervals in each publication time interval Tp is conveniently a power of 2. This may not be so in other implementations, depending on the choice of intervals. For example, if a calendar value is generated each second, but publication occurs only once every week (604,800 seconds), then there will not be a power of 2 number of calendar values as leaf nodes of the Merkle tree structure. As in other trees, this can be handled in a known manner as in giving "byes' in single-elimination sports tournaments by adjusting the tree branches, by using "dummy" inputs, etc.

Although it may in many cases be desirable or even required for the published value to encode information from the entire calendar from the beginning of calendar time, other alternatives can also be implemented as long as suitable bookkeeping routines are included. For example, rather than include all calendar values in the Merkle tree, at each publication time all of the most recent calendar values could be included in the publication computation along with a random sampling of calendar values from previous intervals. This would be one way, for example, to endure that the number of included calendar values is conveniently a power of 2.

Similarly, in some contexts, government authorities require proof of records extending back only for some given time such as three years. In such cases it might be advantageous always to include only calendar values generated during this required period such that only relevant documents are encoded in the most recent publication value.

Another alternative would be for there to be only a single computation of the publication value, including all calendar values from the beginning of system time. This might be useful, for example, in projects with clear time or document limits. For example, in litigation or transactions, parties often submit documents to a "data room" for easy exchange. Calendar values could then be generated periodically as in other cases (perhaps with a longer calendar time interval since documents will generally not be submitted as frequently as in large-scale, universally accessible implementations of the invention's infrastructure), but with only a single computation of a publication value when all parties agree to close the data room. The publication value would then be a form of "seal" on the body of submitted documents, which could later be used for recomputation and verification of any document ever submitted into the data room.

It is not absolutely necessary for the publication value to be computed using the Merkle hash tree data structure illustrated in FIG. 17. One alternative might be, for example, that all calendar values over the publication time interval are concatenated and then hashed as a whole together with a pseudo-random number, which then becomes part of the extended data signature vectors.

It is stated in this description that the various hash functions used in the different infrastructure layers are "deterministic" or "known". This means that, given identical input arguments and state, a function will produce the same output. This does not mean, however, that the input arguments or other possibly internal parameters used in the hashing calculations themselves are non-stochastic. For example, a hash function could generate and use one or more random numbers along with the presented input arguments to compute its output value. For verifiability, these random bit strings must then be included or otherwise associated with the registered documents and be made available to those who later wish to authenticate a version of the document. As long as these random numbers are made available for later recomputation of the same hash function, future systems performing the recomputation would get a result consistent with the original.

As for consistency, note that it is not a requirement for systems in any given layer to apply the same hash functions. For example, the transformation functions used in different client systems could be different. As long as the functions at each place in the recomputation path are known to whoever later wants to authenticate a document through recomputation, the authentication process will work properly. Adding a hash function identifier as an input parameter to the preparation of the registration request would be one convenient way to enable future users to correctly authenticate a document through recomputation.

Arne Ansper, Ahto Buldas, Märt Saarepera, Jan Willemson, "Improving the Availability of Time-Stamping Services, Proceedings of the 6th Australasian Conference on Information Security and Privacy", p. 360-375, Jul. 11-13, 2001, describes a core layer structure that uses a "linking" scheme, such that all the leaf hash values are linked to each other in a form of a chain. The invention described in this application improves on such schemes by not requiring linking as in the Ansper, et al., paper. The chain structure described in that paper poses many technical restrictions to the implementation of an authentication scheme. For example, previous leaves must be "ready" when computing the next one.

It would in general be impractical to publish composite values too frequently. Whereas input aggregation and computation of calendar value may occur at relatively short time periods such as one second or even less, physical publication may occur much less frequently, for example, on the order of days or weeks. The decision about the publication time interval will be a trade-off between a desire not to have too many published values and the desire to reduce the time during which a client must temporarily rely on a digital signature. System designers will make this trade-off choice based on their particular needs and wishes.

The distributed infrastructure described and illustrated in this application can now be seen to have all or at least most (depending upon the chosen implementation options) of the following advantages: 1) there is no need for users or third parties to trust any entity since digital input records are independently verifiable; 2) the ability to verify documents may actually continue beyond the lifetime of the core system itself and there are no values such as keys that cannot be allowed to expire; 3) the infrastructure is scalable almost without limit without a significant computational burden on the core; 4) because there is no single point of failure (recall that a client may contact any gateway and a gateway may communicate with any aggregator, all of which may be duplicated if desired), the infrastructure will have a reliably high availability rate; 5) the cost to expand the infrastructure is only marginal; 6) the infrastructure may be made global through suitable physical and logical location of aggregators and gateways; 7) provability—the system according to the invention is provably secure. Even if the system administrator of the core itself will have no back door that could defeat authentication once composite values are published, at which time the system is secure to the degree of security of the properties of the hash functions used in the computations; and 8) the infrastructure is mostly open and it is not possible to backdate any entry because of the published nature of the composite signature value. One other advantageous feature of the infrastructure is that it is not necessary for there to be any state in the aggregation tree.

Note that there is no clock needed in the tree structures. Although a time parameter may be included in the core or elsewhere in the infrastructure, for example, to determine when to compute a new current calendar value, knowledge of absolute time is not structurally required for this infrastructure to enable trust-free authentication of registered documents. Clocks may also be used for synchronization but this will in most implementations be primarily for the purpose of maintenance and engineering. Synchronization will also be advantageous for latency, and as such a stable clock is an advantage, but it is not necessary for use of an infrastructure as described here. A precise time base for deciding when to cut off receipt of input values for computing over the current calendar time interval also has the advantage of making it easier for bookkeeping and auditing of the integrity of the core system. From a purely technical perspective, however, it would be possible to dispense with a time base altogether. For example, the system could wait until it has received some predetermined number of signature requests from clients before computing all of the hash trees needed to generate an uppermost core value. This would of course risk possibly unacceptable wait times for some clients, but still it is a possibility.

Throughout this description, reference is made to computing values by applying various functions such as hash functions. For example, in FIG. 15, the client 2010-1 is shown as having a software module 2016 to do this. The hardware and software modules required to input values and compute outputs according to pre-programmed functions is of course well known in the art of computer science. Similar structures will be found in the other systems of the infrastructure, as well as the hardware and software needed for communication between the different illustrated systems, including where this communication is over a network.

We claim:

1. A method for enabling authentication of digital records, comprising:
   receiving, at a core system on a core processing level, from each of at least one highest non-core processing system at a respective highest non-core processing level, a current highest-level combined output value that is formed as digital combinations of successively lower-level combined output values computed in lower non-core processing levels as node values of a tree data structure having lowest level inputs formed as digital transformations, computed in user-level systems, of digital input records;
   computing, for a current calendar period, a current calendar value as a digital combination of the current highest-level combined output values;
   returning to at least the highest non-core processing level from the core system the current calendar value, whereupon recomputation parameters are distributed downward to the user-level systems for association with respective ones of the digital input records such that an arbitrary subsequent test digital record is considered authenticated relative to the corresponding digital input record if, applying the corresponding digital transformation to the test digital record and, using the recomputation parameters to recomputed the node values upward through the tree data structure and core, the same current calendar value is attained as when it was originally computed with the corresponding digital input record forming the lowest level input;
   compiling and maintaining a calendar, said calendar comprising a set of the current calendar value and of previous calendar values computed in previous calendar periods from the beginning of an initial calendar time, such that there is a correspondence between calendar values in the calendar and physical time;
   periodically computing a composite calendar value as a function of at least a subset of the set of the calendar values in the calendar including the current calendar value; and
   distributing downward to at least one non-core processing level recomputation parameters of the composite calendar value in addition to the recomputation parameters of the current calendar value, whereupon the arbitrary subsequent test digital record is considered trust-independently authenticated relative to the corresponding digital input record if, applying the corresponding digital transformation to the test digital record and, using the recomputation parameters of the current calendar value and the composite calendar value to recomputed the node values upward through the tree data structure and core, the same composite calendar value is attained as when it was originally computed in which:
   the recomputation parameters are keyless and therefore independent of any trust authority parameters, including cryptographic keys.

2. A method as in claim 1, further comprising computing the composite calendar value as the root value of a non-linking, non-chaining, Merkle tree structure having the current calendar values as leaf nodes.

3. A method as in claim 1, in which the digital combinations are cryptographic hashes.

4. A method as in claim 1, in which the tree data structure is a hash tree data structure.

5. A method as in claim 1, in which the recomputation parameters include, for each digital input record, the sibling node values in a directed path in the tree data structure from the digital transformations of the digital input record up to the current calendar value.

6. A method as in claim 1, in which the recomputation parameters include, for each digital input record, the sibling node values in a directed path in the tree data structure from the digital transformations of the digital input record up to the composite calendar value.

* * * * *